(12) United States Patent
Hashimoto et al.

(10) Patent No.: US 9,823,439 B2
(45) Date of Patent: Nov. 21, 2017

(54) IMAGING LENS

(71) Applicant: KANTATSU CO., LTD., Yaita-shi, Tochigi (JP)

(72) Inventors: Masaya Hashimoto, Sukagawa (JP); Hisao Fukaya, Sukagawa (JP)

(73) Assignee: KANTATSU CO., LTD., Yaita (JP)

( * ) Notice: Subject to any disclaimer, the term of this patent is extended or adjusted under 35 U.S.C. 154(b) by 0 days.

(21) Appl. No.: 15/099,152

(22) Filed: Apr. 14, 2016

(65) Prior Publication Data
US 2016/0306143 A1 Oct. 20, 2016

(30) Foreign Application Priority Data
Apr. 14, 2015 (JP) .................. 2015-082714

(51) Int. Cl.
*G02B 9/60* (2006.01)
*G02B 13/00* (2006.01)

(52) U.S. Cl.
CPC ........... *G02B 9/60* (2013.01); *G02B 13/0045* (2013.01)

(58) Field of Classification Search
CPC ...................................... G02B 9/60
USPC ....................................... 359/764
See application file for complete search history.

(56) References Cited

U.S. PATENT DOCUMENTS

2015/0212297 A1* 7/2015 Chen .................. G02B 13/0045
348/340

OTHER PUBLICATIONS

"Fundamental Optics," CVI Melles Griot and Auburn SeeWolf, LLC; http://www.cvimellesgriot.com/products/Documents/TechnicalGuide/fundamental-Optics.pdf, accessed Nov. 2, 2012; pp. 1-58.

* cited by examiner

*Primary Examiner* — Darryl J Collins
(74) *Attorney, Agent, or Firm* — Oliff PLC

(57) ABSTRACT

A compact high-resolution imaging lens which meets the demands for low-profileness, a low F-value and a wide field of view and corrects aberrations properly. It includes, in order from the object side: a first positive lens having a convex object-side surface; a second negative lens having a convex object-side surface; a third lens; a fourth positive lens; and a fifth negative double-sided aspheric lens having a concave image-side surface. When Fno denotes F-number, ih maximum image height, TTL total track length, f45 the composite focal length of the fourth and fifth lenses, r5 and r6 the curvature radii of the third lens object-side and image-side surfaces, r7 and r8 the curvature radii of the fourth lens object-side and image-side surfaces, and r9 and r10 the curvature radii of the fifth lens object-side and image-side surfaces, respectively, it satisfies the following conditions: Fno≤2.4; TTL/2ih<0.9; f45<0; 0<r5/r6<4.0; 0.5<(r7+r8)/(r7−r8)<3.0; and 0.4<(r9+r10)/(r9−r10)<4.0.

20 Claims, 18 Drawing Sheets

IMAGING LENS

FIELD OF THE INVENTION

The present invention relates to an imaging lens which forms an image of an object on a solid-state image sensor such as a CCD sensor or C-MOS sensor used in a compact image pickup device, and more particularly to an imaging lens which is built in an image pickup device mounted in an increasingly compact and low-profile smartphone, mobile phone, PDA (Personal Digital Assistant), game console, information terminal such as a PC, home appliance or vehicle with a camera function.

DESCRIPTION OF THE RELATED ART

In recent years, there has been a general tendency that many information terminals have a camera function. Also, various products with high convenience such as home appliances with a camera have been introduced into the market constantly. The demand for home appliances and information terminals which have a camera function is expected to grow and efforts to develop such products will be accelerated.

The imaging lenses mounted in such products are strongly anticipated not only to provide high resolution to cope with an increase in the number of pixels but also to be compact and low-profile enough to match the trend toward a more low-profile product, and offer high brightness and a wide field of view.

However, in order to provide an imaging lens which meets all the demands for low-profileness, a low F-value, and a wide field of view, the problem of difficulty in correction of aberrations in the peripheral area of an image must be addressed. Unless the problem is addressed, it is difficult to deliver high optical performance throughout the image.

In the conventional art, for example, the imaging lenses described in Patent Literature 1 (JP-A-2011-257447) and Patent Literature 2 (JP-A-2011-141396) are known as imaging lenses which feature compactness and high-resolution.

Patent Literature 1 discloses an imaging lens which includes, in order from an object side, a first lens with positive refractive power, a second meniscus lens with negative refractive power having a concave surface on the object side, a third lens with positive refractive power, a fourth meniscus lens with positive refractive power having a concave surface on the object side near an optical axis, and a fifth lens with negative refractive power near the optical axis and positive refractive power in the peripheral area.

Patent Literature 2 discloses an imaging lens which includes, in order from an object side, a first lens with positive refractive power, a second lens with negative refractive power, a third lens with positive refractive power having a convex surface on an image side, a fourth meniscus lens having a convex surface on the image side, and a fifth lens in which negative refractive power gradually decreases in the direction from the center to the peripheral area and changes to positive refractive power in the peripheral area.

SUMMARY OF THE INVENTION

The imaging lens described in Patent Literature 1 is a relatively low-profile imaging lens which provides high brightness with an F-value of about 1.9, has a ratio of total track length to the diagonal length of the effective imaging plane of the image sensor (hereinafter referred to as "TTL-to-diagonal ratio") of about 1.0 and corrects various aberrations properly. However, its field of view is about 65 degrees, which merely meets the existing level of demand. In an attempt to offer a wider field of view while maintaining the F-value and TTL-to-diagonal ratio at the present level, the positive refractive power of the optical system must be relatively increased, which makes it difficult to achieve power balancing among the constituent lenses and correct axial chromatic aberrations and peripheral aberrations.

The imaging lens described in Patent Literature 2 is also a relatively low-profile imaging lens which provides high brightness with an F-value of about 2.0, has a TTL-to-diagonal ratio of about 1.0 and delivers high optical performance. However, its field of view is merely about 60 degrees. The imaging lens described in Patent Literature 2 cannot offer, for example, a field of view of 70 degrees or more while maintaining the F-value, TTL-to-diagonal ratio, and optical performance at the present level.

The present invention has been made in view of the above problem, and an object of the present invention is to provide a compact high-resolution imaging lens which meets the demands for low-profileness, a low F-value and a wide field of view in a balanced manner and corrects various aberrations properly.

Here, "low-profile" means that total track length is less than 5 mm, the telephoto ratio is less than 1.2 and the TTL-to-diagonal ratio is less than 0.9; "low F-value" means brightness with an F-value of 2.4 or less; and "wide field of view" means a field of view of 70 degrees or more. Here, regarding the TTL-to-diagonal ratio, the diagonal length of the effective imaging plane of the image sensor is equal to the diameter of an effective image circle which is twice the maximum image height, in which the maximum image height is the vertical height from an optical axis to the point where a light ray incident on the imaging lens at a maximum field of view enters the imaging plane.

Regarding the terminology used here, a convex or concave surface of a lens is defined as a lens surface whose paraxial portion (portion near the optical axis) is convex or concave, and a pole point is defined as an off-axial point on an aspheric surface at which a tangential plane intersects the optical axis perpendicularly. Total track length is defined as the distance on the optical axis from the object-side surface of the optical element nearest to the object to the image plane, when the thickness of an optical element not involved in divergence or convergence of light, such as an IR cut filter or cover glass, is air-converted.

According to an aspect of the present invention, there is provided an imaging lens to form an image of an object on a solid-state image sensor, which includes, in order from an object side to an image side: a first lens with positive refractive power having a convex surface on the object side; a second lens with negative refractive power having a convex surface on the object side; a third lens with positive or negative refractive power; a fourth lens with positive refractive power; and a fifth lens with negative refractive power as a double-sided aspheric lens having a concave surface on the image side.

The imaging lens satisfies conditional expressions (1) to (6) below:

$$Fno \leq 2.4 \quad (1)$$

$$TTL/2ih < 0.9 \quad (2)$$

$$f45 < 0 \quad (3)$$

$$0 < r5/r6 < 4.0 \quad (4)$$

$$0.5 < (r7+r8)/(r7-r8) < 3.0 \tag{5}$$

$$0.4 < (r9+r10)/(r9-r10) < 4.0 \tag{6}$$

where Fno denotes an F-number, ih denotes maximum image height, TTL denotes total track length, f45 denotes the composite focal length of the fourth lens and the fifth lens, r5 denotes the curvature radius of the object-side surface of the third lens, r6 denotes the curvature radius of the image-side surface of the third lens, r7 denotes the curvature radius of the object-side surface of the fourth lens, r8 denotes the curvature radius of the image-side surface of the fourth lens, r9 denotes the curvature radius of the object-side surface of the fifth lens, and r10 denotes the curvature radius of the image-side surface of the fifth lens.

The imaging lens according to the present invention includes, in order from an object side, a lens group with positive composite refractive power, including the first lens, the second lens, and the third lens, and a lens group with negative composite refractive power, including the fourth lens and the fifth lens, making a so-called telephoto arrangement. In addition, since the telephoto ratio is 1.20 or less, the total track length is short and the imaging lens is low-profile.

In the above configuration, the positive lens group including the first, second, and third lenses enables the imaging lens to be low-profile and offer a wide field of view and correct chromatic aberrations properly. The first lens is a lens with positive refractive power having a convex surface on the object side, which has strong positive refractive power to achieve the low-profileness of the imaging lens and a wide field of view. The second lens is a lens with negative refractive power having a convex surface on the object side, which properly corrects spherical aberrations and chromatic aberrations which occur on the first lens. The third lens has the weakest refractive power among the constituent lenses of the imaging lens and mainly corrects high-order spherical aberrations and coma aberrations, and astigmatism.

The negative lens group including the fourth and fifth lenses contributes to the low-profileness of the imaging lens and a wide field of view and properly corrects various aberrations. The strong positive refractive power of the fourth lens is appropriately balanced with the positive refractive power of the first lens so that the imaging lens is low-profile, offers a wide field of view and corrects astigmatism and field curvature properly. The fifth lens is a double-sided aspheric lens with negative refractive power having a concave surface on the image side, which properly corrects spherical aberrations and chromatic aberrations which occur on the fourth lens, corrects field curvature and controls the angle of a chief ray incident on the image sensor effectively.

The conditional expression (1) indicates a condition to make the lens brightness appropriate. If the value is above the upper limit of the conditional expression (1), undesirably the brightness would be insufficient for a compact high-pixel image sensor and image clearness might be impaired.

The conditional expression (2) defines an appropriate range for the TTL-to-diagonal ratio. If the value is above the upper limit of the conditional expression (2), the total track length would be too long to meet the demand for low-profileness.

The conditional expression (3) defines an appropriate range for the composite refractive power of the fourth and fifth lenses and indicates that the composite refractive power of the fourth and fifth lenses is negative. The positive lens group of the three lenses located nearer to the object and the negative lens group of the two lenses located nearer to the image plane increase the telephoto capability and contribute to a shorter total track length.

The conditional expression (4) defines the paraxial shape of the third lens, and indicates a condition to suppress astigmatism. When the conditional expression (4) is satisfied, the third lens corrects astigmatism properly since its paraxial portion has a meniscus shape.

The conditional expression (5) defines the paraxial shape of the fourth lens, and indicates a condition to ensure the low-profileness of the imaging lens and correct various aberrations. If the value is above the upper limit of the conditional expression (5), the refractive power of the image-side surface of the fourth lens would be too strong to correct high-order aberrations such as field curvature. On the other hand, if the value is below the lower limit of the conditional expression (5), the refractive power of the image-side surface of the fourth lens would be too weak to shorten the total track length. When the conditional expression (5) is satisfied, the imaging lens can be low-profile and high-order aberrations such as field curvature and astigmatism can be corrected while the refractive power of the image-side surface of the fourth lens is prevented from being excessively strong.

The conditional expression (6) defines the paraxial shape of the fifth lens, and indicates a condition to correct various aberrations properly. If the value is above the upper limit of the conditional expression (6), the curvature radius of the image-side surface of the fifth lens would be too strong and cause excessive divergence of light rays, making it difficult to correct field curvature. On the other hand, if the value is below the lower limit of the conditional expression (6), the refractive power of the object-side surface of the fifth lens would be too strong to correct spherical aberrations and field curvature.

Preferably, the imaging lens according to the present invention satisfies a conditional expression (7) below:

$$3.0 < |f3/f| \tag{7}$$

where f denotes the focal length of the overall optical system of the imaging lens and f3 denotes the focal length of the third lens.

The conditional expression (7) defines an appropriate range for the ratio of the focal length of the third lens to the focal length of the overall optical system of the imaging lens. The third lens has the weakest refractive power among the five constituent lenses of the imaging lens and its influence on the refractive power of the overall optical system of the imaging lens, and the refractive power of each of the other constituent lenses is small. Thus, it suppresses axial aberrations and corrects field curvature and distortion properly.

Preferably, the imaging lens according to the present invention satisfies a conditional expression (8) below:

$$0.4 < f4/f < 1.5 \tag{8}$$

where f denotes the focal length of the overall optical system of the imaging lens and f4 denotes the focal length of the fourth lens.

The conditional expression (8) defines an appropriate range for the ratio of the focal length of the fourth lens to the focal length of the overall optical system of the imaging lens, and indicates a condition to achieve the low-profileness of the imaging lens and correct various aberrations properly. If the value is above the upper limit of the conditional expression (8), the refractive power of the fourth lens would be too weak to shorten the total track length. On the other hand, if the value is below the lower limit of the conditional expression (8), the refractive power of the fourth lens would be too strong, and increase spherical aberrations and coma aberrations, thus making it difficult to deliver high optical performance.

Preferably, the imaging lens according to the present invention satisfies a conditional expression (9) below:

$$-1.2<f5/f<-0.2 \qquad (9)$$

where f denotes the focal length of the overall optical system of the imaging lens and f5 denotes the focal length of the fifth lens.

The conditional expression (9) defines an appropriate range for the ratio of the focal length of the fifth lens to the focal length of the overall optical system of the imaging lens, and indicates a condition to shorten the total track length and correct various aberrations properly. If the value is above the upper limit of the conditional expression (9), the negative refractive power of the fifth lens would be too strong to correct coma aberrations and distortion in the peripheral area and field curvature. Also, the back focus would be longer, resulting in a longer total track length. On the other hand, if the value is below the lower limit of the conditional expression (9), the refractive power of the fifth lens would be too weak to correct spherical aberrations and chromatic aberrations which occur on the fourth lens, though it is advantageous in shortening the total track length.

Preferably, the imaging lens according to the present invention satisfies a conditional expression (10) below:

$$0.08<T3/TTL<0.16 \qquad (10)$$

where T3 denotes the distance on the optical axis between the image-side surface of the third lens and the object-side surface of the fourth lens and TTL denotes total track length.

The conditional expression (10) indicates a condition to ensure that the air gap between the third lens and the fourth lens is within an appropriate range. If the value is above the upper limit of the conditional expression (10), the air gap between the third lens and the fourth lens would be too wide to ensure a short total track length. On the other hand, if the value is below the lower limit of the conditional expression (10), the air gap between the third lens and the fourth lens would be too narrow and limit the freedom in lens shape, thus making it difficult to correct aberrations.

Preferably, the imaging lens according to the present invention satisfies a conditional expression (11) below:

$$0.5<f1/f<2.0 \qquad (11)$$

where f denotes the focal length of the overall optical system of the imaging lens and f1 denotes the focal length of the first lens.

The conditional expression (11) defines an appropriate range for the ratio of the focal length of the first lens to the focal length of the overall optical system of the imaging lens, and indicates a condition to suppress spherical aberrations and achieve low-profileness and a wide field of view. If the value is above the upper limit of the conditional expression (11), the positive refractive power of the first lens would be too weak to achieve the low-profileness of the imaging lens and a wide field of view, though it is advantageous in suppressing spherical aberrations. On the other hand, if the value is below the lower limit of the conditional expression (11), the positive refractive power of the first lens would be too strong and increase spherical aberrations, though it is advantageous in achieving the low-profileness of the imaging lens and a wide field of view.

Preferably, the imaging lens according to the present invention satisfies a conditional expression (12) below:

$$1.5<r3/r4<50 \qquad (12)$$

where r3 denotes the curvature radius of the object-side surface of the second lens and r4 denotes the curvature radius of the image-side surface of the second lens.

The conditional expression (12) defines the paraxial shape of the second lens, and indicates a condition to correct various aberrations properly. When the refractive power of the image-side surface of the second lens is increased to the extent the conditional expression (12) is satisfied, chromatic aberrations which occur on the first lens are corrected and also coma aberrations, field curvature, and astigmatism are corrected properly.

Preferably, in the imaging lens according to the present invention, the fourth lens has a convex surface on the image side.

When the image-side surface of the fourth lens is convex, the emission angle of light rays from the surface is decreased. Consequently, it is easy to correct distortion, chromatic aberrations of magnification and astigmatism which increase as the total track length is shortened, thereby ensuring high optical performance.

Preferably, in the imaging lens according to the present invention, the fifth lens has a pole point off the optical axis on the image-side surface.

The pole point off the optical axis on the image-side surface of the fifth lens makes it possible to correct distortion and field curvature, and control the angle of a chief ray incident on the image sensor more effectively.

Preferably, the imaging lens according to the present invention satisfies a conditional expression (13) below:

$$20<vd1-vd2<40 \qquad (13)$$

where vd1 denotes the Abbe number of the first lens at d-ray and vd2 denotes the Abbe number of the second lens at d-ray.

The conditional expression (13) defines an appropriate range for the difference in Abbe number at d-ray between the first lens and the second lens, and indicates a condition to correct chromatic aberrations properly. When a material which satisfies the conditional expression (13) is adopted, chromatic aberrations are corrected properly.

Preferably, the imaging lens according to the present invention satisfies a conditional expression (14) below:

$$50<vd3<70 \qquad (14)$$

where vd3 denotes the Abbe number of the third lens at d-ray.

The conditional expression (14) defines an appropriate range for the Abbe number of the third lens at d-ray. When a material which satisfies the conditional expression (14) is adopted, axial chromatic aberrations are corrected properly. In addition, the lens material cost can be reduced.

Preferably, the imaging lens according to the present invention satisfies a conditional expression (15) below:

$$0.70<ih/f<1.0 \qquad (15)$$

where f denotes the focal length of the overall optical system of the imaging lens and ih denotes maximum image height.

The conditional expression (15) defines an appropriate range for the ratio of maximum image height to the focal length of the overall optical system of the imaging lens, which represents the field of view. If the value is above the upper limit of the conditional expression (15), the field of view would be too wide to correct aberrations properly, leading to deterioration in optical performance. On the other hand, if the value is below the lower limit of the conditional expression (15), it would be easy to correct aberrations and advantageous in increasing the optical performance but it would be difficult to achieve a wide field of view.

According to an aspect of the present invention, there is provided a compact high-resolution imaging lens which meets the demands for low-profileness, a low F-value and a wide field of view in a balanced manner and corrects various aberrations properly.

DETAILED DESCRIPTION OF THE PREFERRED EMBODIMENTS

Hereinafter, the preferred embodiment of the present invention will be described in detail referring to the accompanying drawings.

FIGS. 1, 3, 5, 7, 9, 11, 13, 15, and 17 are schematic views showing the general configurations of the imaging lenses in Examples 1 to 9 according to this embodiment, respectively. Since all these examples have the same basic lens configuration, the general configuration of an imaging lens according to this embodiment is explained below mainly referring to the schematic view of Example 1.

Figure 1:
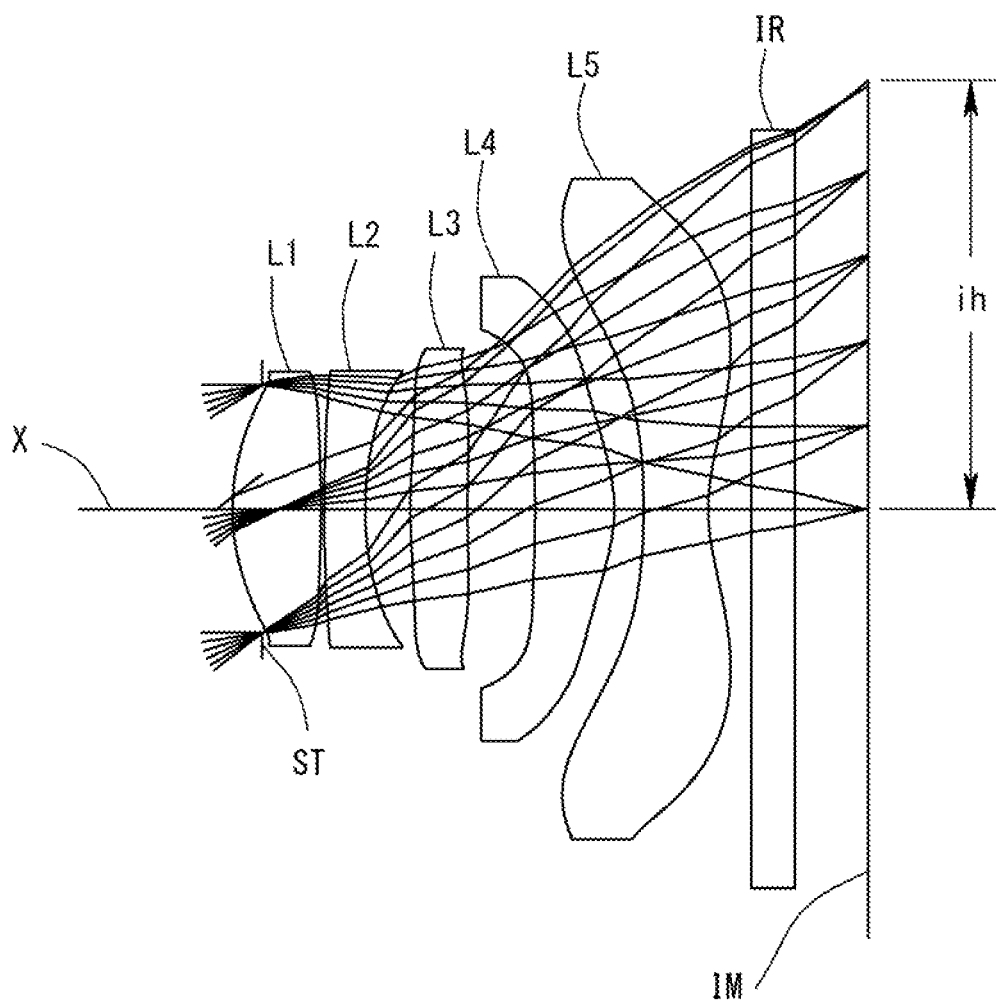
FIG. 1 is a schematic view showing the general configuration of an imaging lens in Example 1 according to an embodiment of the present invention.

As shown in FIG. 1, the imaging lens according to this embodiment includes, in order from an object side to an image side, an aperture stop ST, a first lens L1 with positive refractive power, a second lens L2 with negative refractive power, a third lens L3 with positive refractive power, a fourth lens L4 with positive refractive power, and a fifth lens L5 with negative refractive power.

A filter IR such as an infrared cut filter or cover glass is located between the fifth lens L5 and an image plane IM. The filter IR is omissible. Since an imaging position in the optical system differs depending on the thickness of the filter IR, the total track length in the present invention is defined as the distance on the optical axis from the object-side surface of the optical element nearest to the object to the image plane, in which the thickness of an optical element such as an IR cut filter or cover glass is air-converted.

The imaging lens, composed of five constituent lenses, includes a lens group with positive composite refractive power, including the first lens L1, the second lens L2, and the third lens L3, and a lens group with negative composite refractive power, including the fourth lens L4 and the fifth lens L5, making a telephoto arrangement which is advantageous in shortening the total track length.

In the imaging lens, composed of five constituent lenses, the first lens L1 is a biconvex lens with positive refractive power having a convex surface on the object side. In its biconvex shape, the curvature radius of the object-side surface is smaller than the curvature radius of the image-side surface. The positive refractive power is appropriately distributed to the both surfaces so that spherical aberrations are suppressed and due to its strong positive refractive power the imaging lens can be low-profile and offer a wide field of view. Alternatively, the image-side surface of the first lens L1 may be concave. If so, it is desirable that the curvature radius of the image-side surface be larger than the curvature radius of the object-side surface to the extent that the refractive power does not become too low and spherical aberrations do not increase. In Examples 4 to 9, the first lens L1 is a meniscus lens having a convex surface on the object side.

The second lens L2 is a lens with negative refractive power having a convex surface on the object side, which properly corrects spherical aberrations and chromatic aberrations which occur on the first lens L1.

The third lens L3 has the weakest refractive power among the constituent lenses of the imaging lens. The aspheric surfaces on the both sides correct high-order spherical aberrations and coma aberrations, and astigmatism. The third lens L3 has a meniscus shape with a convex surface on the object side and the concave image-side surface corrects axial chromatic aberrations properly by its diverging effect. Although the third lens L3 has weak positive refractive power in Example 1, it may have weak negative refractive power as in Example 4. The third lens L3 has only to be a meniscus lens and it may have a meniscus shape with a concave surface on the object side as in Examples 4 to 9.

The fourth lens L4 is a meniscus lens with positive refractive power having a convex surface on the image side. Its refractive power is appropriately balanced with the refractive power of the first lens L1 so that the imaging lens can be low-profile and offer a wide field of view. The object-side surface is an aspheric surface with its peripheral portion curved toward the object, which corrects astigmatism and field curvature properly. Alternatively, the fourth lens L4 may have a biconvex shape. If so, the positive refractive power is appropriately distributed to the object-side surface and the image-side surface to suppress manufacturing error sensitivity and achieve the low-profileness of the imaging lens and a wide field of view. In Examples 4 to 9, the fourth lens L4 has a biconvex shape.

The fifth lens L5 is a lens with negative refractive power having a concave surface on the image side. It has aspheric surfaces on both sides and the aspheric image-side surface has a pole point off an optical axis X. These aspheric surfaces properly correct spherical aberrations and chromatic aberrations which occur on the fourth lens L4, and field curvature and control the angle of a chief ray incident on the image sensor within an appropriate range. In this example, the fifth lens L5 has a concave object-side surface and guides light rays to the image plane IM while keeping the refracting angle of the rays small, so that field curvature is corrected more properly. Alternatively, the fifth lens L5 may have a meniscus shape with a concave surface on the image side and a convex surface on the object side as in Examples 5 to 9.

Since the aperture stop ST is located between the apex and end edge of the object-side surface of the first lens L1, the entrance pupil is remote from the image plane IM, making it easy to ensure telecentricity.

When all the constituent lenses of the imaging lens according to this embodiment are made of plastic material, the manufacturing process is easier and the imaging lens can be mass-produced at low cost. Both surfaces of each lens have appropriate aspheric shapes to correct various aberrations more properly.

The lens material is not limited to plastic material. The lens performance can also be further enhanced by using glass material. Although it is desirable that all the lens surfaces have aspheric shapes, a spherical surface which is easy to make may be adopted depending on the required performance.

When the imaging lens according to this embodiment satisfies conditional expressions (1) to (15) below, it brings about advantageous effects:

$$Fno \leq 2.4 \tag{1}$$

$$TTL/2ih < 0.9 \tag{2}$$

$$f45 < 0 \tag{3}$$

$$0 < r5/r6 < 4.0 \tag{4}$$

$$0.5 < (r7+r8)/(r7-r8) < 3.0 \tag{5}$$

$$0.4 < (r9+r10)/(r9-r0) < 4.0 \tag{6}$$

$$3.0 < |f3/f| \tag{7}$$

$$0.4 < f4/f < 1.5 \tag{8}$$

$$-1.2 < f5/f < -0.2 \tag{9}$$

$$0.08 < T3/TTL < 0.16 \tag{10}$$

$$0.5 < f1/f < 2.0 \tag{11}$$

$$1.5 < r3/r4 < 50 \tag{12}$$

$$20 < vd1 - vd2 < 40 \tag{13}$$

$$50 < vd3 < 70 \tag{14}$$

$$0.70 < ih/f < 1.0 \tag{15}$$

where
Fno: F-number
ih: maximum image height
TTL: total track length
r3: curvature radius of the object-side surface of the second lens L2
r4: curvature radius of the image-side surface of the second lens L2
r5: curvature radius of the object-side surface of the third lens L3
r6: curvature radius of the image-side surface of the third lens L3
r7: curvature radius of the object-side surface of the fourth lens L4
r8: curvature radius of the image-side surface of the fourth lens L4
r9: curvature radius of the object-side surface of the fifth lens L5
r10: curvature radius of the image-side surface of the fifth lens L5
f: focal length of the overall optical system of the imaging lens
f1: focal length of the first lens L1
f3: focal length of the third lens L3
f4: focal length of the fourth lens L4
f5: focal length of the fifth lens L5
f45: composite focal length of the fourth lens L4 and the fifth lens L5
T3: distance on the optical axis X between the image-side surface of the third lens L3 and the object-side surface of the fourth lens L4
vd1: Abbe number of the first lens L1 at d-ray
vd2: Abbe number of the second lens L2 at d-ray
vd3: Abbe number of the third lens L3 at d-ray.

When the imaging lens according to this embodiment satisfies conditional expressions (1a) to (15a) below, it brings about more advantageous effects:

$$Fno \leq 2.3 \tag{1a}$$

$$TTL/2ih < 0.85 \tag{2a}$$

$$f45 < 0 \tag{3a}$$

$$0 < r5/r6 < 3.0 \tag{4a}$$

$$0.5 < (r7+r8)/(r7-r8) < 2.0 \tag{5a}$$

$$0.4 < (r9+r10)/(r9-r10) < 3.0 \tag{6a}$$

$$3.5 < |f3/f| \tag{7a}$$

$$0.4 < f4/f < 1.2 \tag{8a}$$

$$-1.0 < f5/f < -0.3 \tag{9a}$$

$$0.08 < T3/TTL < 0.14 \tag{10a}$$

$$0.5 < f1/f < 1.3 \tag{11a}$$

$$1.5 < r3/r4 < 36 \tag{12a}$$

$$22 < vd1 - vd2 < 37 \tag{13a}$$

$$52 < vd3 < 68 \tag{14a}$$

$$0.70 < ih/f < 0.9. \tag{15a}$$

The signs in the above conditional expressions have the same meanings as those in the preceding paragraph.

When the imaging lens according to this embodiment satisfies conditional expressions (1b) to (15b) below, it brings about particularly advantageous effects:

$$Fno \leq 2.24 \tag{1b}$$

$$TTL/2ih \leq 0.83 \tag{2b}$$

$$f45 < 0 \tag{3b}$$

$0.10 \leq r5/r6 \leq 2.56$ (4b)

$0.72 \leq (r7+r8)/(r7-r8) \leq 1.42$ (5b)

$0.58 \leq (r9+r10)/(r9-r10) \leq 1.50$ (6b)

$3.97 \leq |f3/f|$ (7b)

$0.63 \leq f4/f \leq 1.01$ (8b)

$-0.71 \leq f5/f \leq -0.47$ (9b)

$0.10 \leq T3/TTL \leq 0.13$ (10b)

$0.62 \leq f1/f \leq 0.88$ (11b)

$2.79 \leq r3/r4 \leq 25$ (12b)

$25 \leq vd1 - vd2 \leq 35$ (13b)

$54 \leq vd3 \leq 65$ (14b)

$0.71 \leq ih/f \leq 0.82$ (15b)

The signs in the above conditional expressions have the same meanings as those in the paragraph before the preceding paragraph.

In this embodiment, the aspheric shapes of the lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$ Equation 1

Next, examples of the imaging lens according to this embodiment will be explained. In each example, f denotes the focal length of the overall optical system of the imaging lens, Fno denotes an F-number, ω denotes a half field of view, and ih denotes maximum image height. i denotes a surface number counted from the object side, r denotes a curvature radius, d denotes the distance on the optical axis between lens surfaces (axial surface distance), Nd denotes a refractive index at d-ray (reference wavelength), and vd denotes an Abbe number at d-ray. As for aspheric surfaces, an asterisk (*) after surface number i indicates that the surface concerned is an aspheric surface.

EXAMPLE 1

The basic lens data of Example 1 is shown below in Table 1.

TABLE 1

Numerical Data Example 1
Unit mm f = 3.778
Fno = 2.20
ω (°) = 37.8
ih = 2.934
TTL = 4.304

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.205 | | |
| 2* | 1.576 | 0.612 | 1.5438 | 55.57 |
| 3* | −6.282 | 0.023 | | |
| 4* | 74.000 | 0.280 | 1.6349 | 23.97 |
| 5* | 2.081 | 0.314 | | |
| 6* | 4.433 | 0.395 | 1.5438 | 55.57 |
| 7* | 9.390 | 0.470 | | |
| 8* | −7.936 | 0.548 | 1.5438 | 55.57 |
| 9* | −1.145 | 0.204 | | |
| 10* | −5.130 | 0.445 | 1.5438 | 55.57 |
| 11* | 1.225 | 0.300 | | |
| 12 | Infinity | 0.300 | 1.5168 | 64.20 |
| 13 | Infinity | 0.505 | | |
| Image Plane | Infinity | | | |

Constituent Lens Data

| Lens | Start Surface | Focal Length |
|---|---|---|
| 1 | 2 | 2.382 |
| 2 | 4 | −3.377 |
| 3 | 6 | 15.017 |
| 4 | 8 | 2.394 |
| 5 | 10 | −1.774 |

Telephoto Ratio

TTL/f = 1.139

TABLE 1-continued

Numerical Data Example 1
Unit mm

Aspheric Surface Data

|     | 2nd Surface | 3rd Surface | 4th Surface | 5th Surface | 6th Surface | 7th Surface |
| --- | --- | --- | --- | --- | --- | --- |
| k   | 0.000E+00 | 0.000E+00 | 0.000E+00 | 0.000E+00 | 0.000E+00 | 0.000E+00 |
| A4  | −3.332E−03 | 1.766E−01 | 1.109E−01 | −8.144E−02 | −1.407E−01 | −9.482E−02 |
| A6  | −4.671E−02 | −2.547E−01 | −3.682E−02 | 2.735E−01 | 2.100E−02 | −7.109E−02 |
| A8  | 7.098E−02 | 5.446E−02 | −1.817E−01 | −2.854E−01 | 8.373E−02 | 8.356E−02 |
| A10 | 7.910E−02 | 1.628E−03 | 1.461E−01 | 1.344E−01 | −4.031E−02 | −4.954E−02 |
| A12 | 8.260E−03 | 0.000E+00 | 6.796E−03 | 1.052E−02 | 1.767E−02 | 3.807E−02 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

|     | 8th Surface | 9th Surface | 10th Surface | 11th Surface |
| --- | --- | --- | --- | --- |
| k   | 0.000E+00 | −6.728E−00 | 0.000E+00 | −9.707E−00 |
| A4  | 9.822E−02 | −1.661E−02 | −9.314E−02 | −1.074E−01 |
| A6  | −8.990E−02 | 1.861E−02 | 2.970E−02 | 4.970E−02 |
| A8  | −7.577E−03 | −2.093E−01 | −2.216E−03 | −2.010E−02 |
| A10 | −1.495E−02 | 8.111E−02 | 0.000E+00 | 4.853E−03 |
| A12 | 0.000E+00 | −1.110E−02 | 0.000E+00 | −6.433E−04 |
| A14 | 0.000E+00 | 0.000E+00 | 0.000E+00 | 3.185E−05 |
| A16 | 0.000E+00 | 0.000E+00 | 0.000E+00 | 8.235E−07 |

As shown in Table 10, the imaging lens in Example 1 satisfies conditional expressions (1) to (15).

Figure 2:
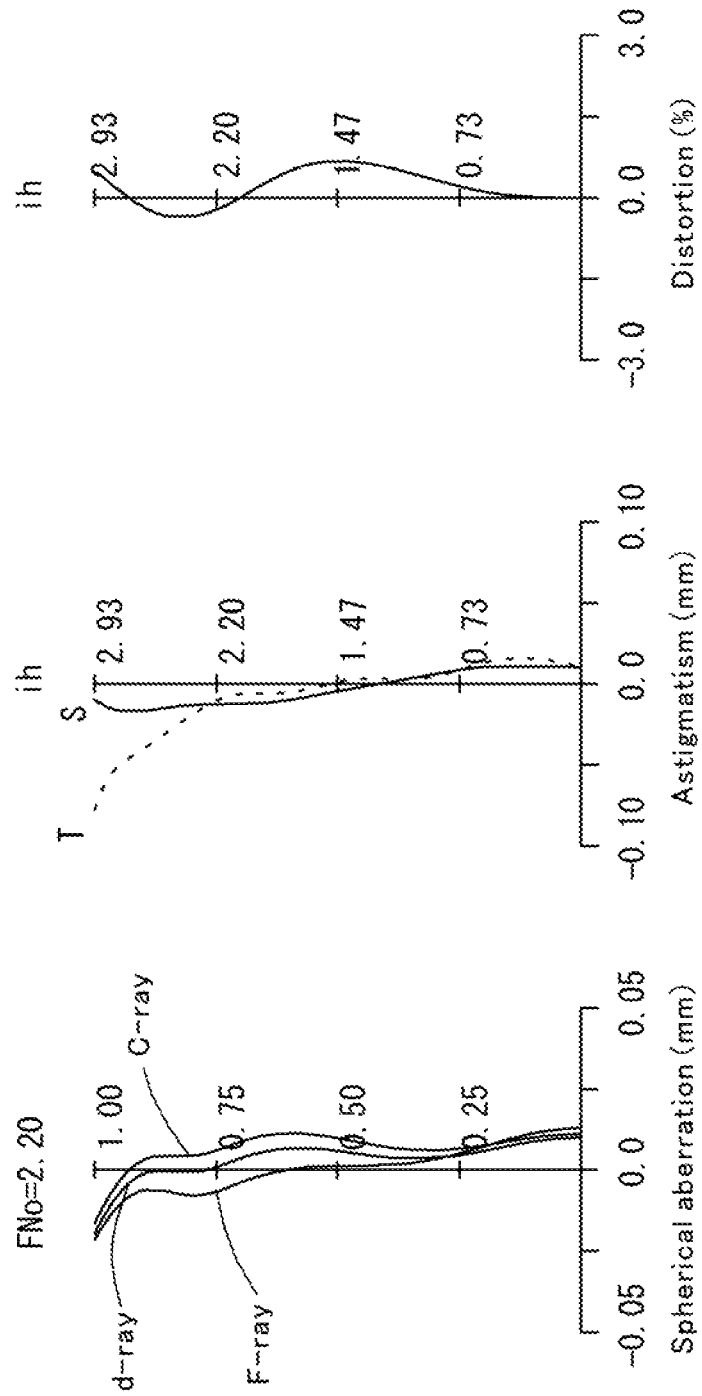
FIG. 2 shows spherical aberration, astigmatism, and distortion of the imaging lens in Example 1.
Figure 3:
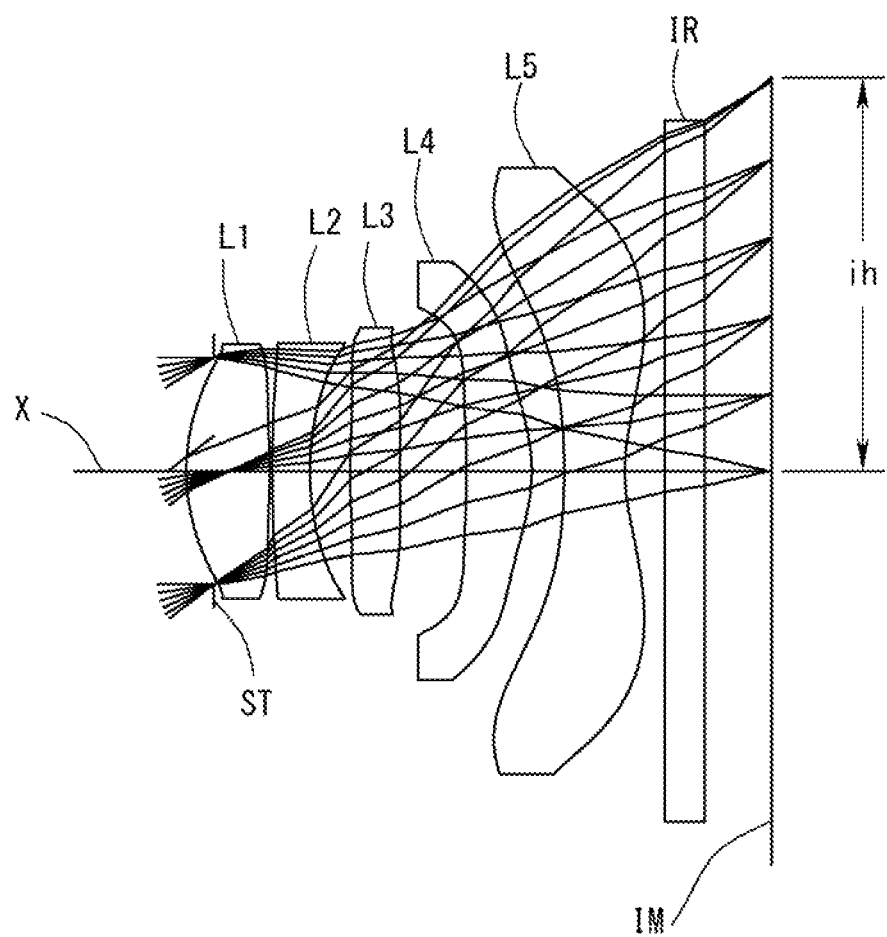
FIG. 3 is a schematic view showing the general configuration of an imaging lens in Example 2 according to the embodiment.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on sagittal image surface S and the amount of aberration at d-ray on tangential image surface T (the same is true for FIGS. 4, 6, 8, 10, 12, 14, 16, and 18). As shown in FIG. 2, each aberration is corrected properly.

EXAMPLE 2

The basic lens data of Example 2 is shown below in Table 2.

TABLE 2

Numerical Data Example 2
Unit mm f = 3.819
Fno = 2.24
ω (°) = 37.4
ih = 2.934
TTL = 4.304

Surface Data

| Surface Number i | Curvature Radius r | Surface Distance d | Refractive Index Nd | Abbe Number νd |
| --- | --- | --- | --- | --- |
| (Object) | Infinity | Infinity |   |   |
| 1 (Stop) | Infinity | −0.205 |   |   |
| 2* | 1.570 | 0.624 | 1.5438 | 55.57 |
| 3* | −6.260 | 0.023 |   |   |
| 4* | 38.416 | 0.280 | 1.6349 | 23.97 |
| 5* | 2.021 | 0.303 |   |   |
| 6* | 5.947 | 0.373 | 1.5438 | 55.57 |
| 7* | 20.654 | 0.502 |   |   |
| 8* | −7.135 | 0.491 | 1.5438 | 55.57 |
| 9* | −1.234 | 0.243 |   |   |
| 10* | −5.266 | 0.455 | 1.5438 | 55.57 |
| 11* | 1.349 | 0.300 |   |   |
| 12 | Infinity | 0.300 | 1.5168 | 64.20 |
| 13 | Infinity | 0.503 |   |   |
| Image Plane | Infinity |   |   |   |

Constituent Lens Data

| Lens | Start Surface | Focal Length |
| --- | --- | --- |
| 1 | 2 | 2.375 |
| 2 | 4 | −3.369 |
| 3 | 6 | 15.222 |

TABLE 2-continued

Numerical Data Example 2
Unit mm

| 4 | 8 | 2.664 |
|---|---|---|
| 5 | 10 | −1.928 |

Telephoto Ratio

TTL/f = 1.127

Aspheric Surface Data

|   | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −2.493E−03 | 1.878E−01 | 1.185E−01 | −7.711E−02 | 1.426E−01 | −1.072E−01 |
| A6 | −4.740E−02 | −2.371E−01 | −2.976E−02 | 2.633E−01 | 1.811E−02 | −6.076E−02 |
| A8 | 8.128E−02 | 2.181E−02 | −2.207E−01 | −3.034E−01 | 9.473E−02 | 8.592E−02 |
| A10 | −7.570E−02 | 1.638E−02 | 1.459E−01 | 1.497E−01 | −4.140E−02 | −5.935E−02 |
| A12 | −8.190E−03 | 0.000E+00 | 1.886E−02 | 9.327E−03 | 2.412E−02 | 5.221E−02 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

|   | 8th Surface | 9th Surface | 10th Surface | 11th Surface |
|---|---|---|---|---|
| k | 0.000E+00 | −7.318E+00 | 0.000E+00 | −1.049E+01 |
| A4 | 1.108E−01 | 2.440E−03 | −7.654E−02 | −9.858E−02 |
| A6 | −1.083E−01 | 1.766E−01 | 2.387E−02 | 4.532E−02 |
| A8 | 1.172E−02 | −2.099E−01 | −1.708E−03 | −1.945E−02 |
| A10 | −2.310E−02 | 8.126E−02 | 0.000E+00 | 4.904E−03 |
| A12 | 0.000E+00 | −1.093E−02 | 0.000E+00 | −6.545E−04 |
| A14 | 0.000E+00 | 0.000E+00 | 0.000E+00 | 3.058E−05 |
| A16 | 0.000E+00 | 0.000E+00 | 0.000E+00 | 9.824E−07 |

As shown in Table 10, the imaging lens in Example 2 satisfies conditional expressions (1) to (15).

Figure 4:
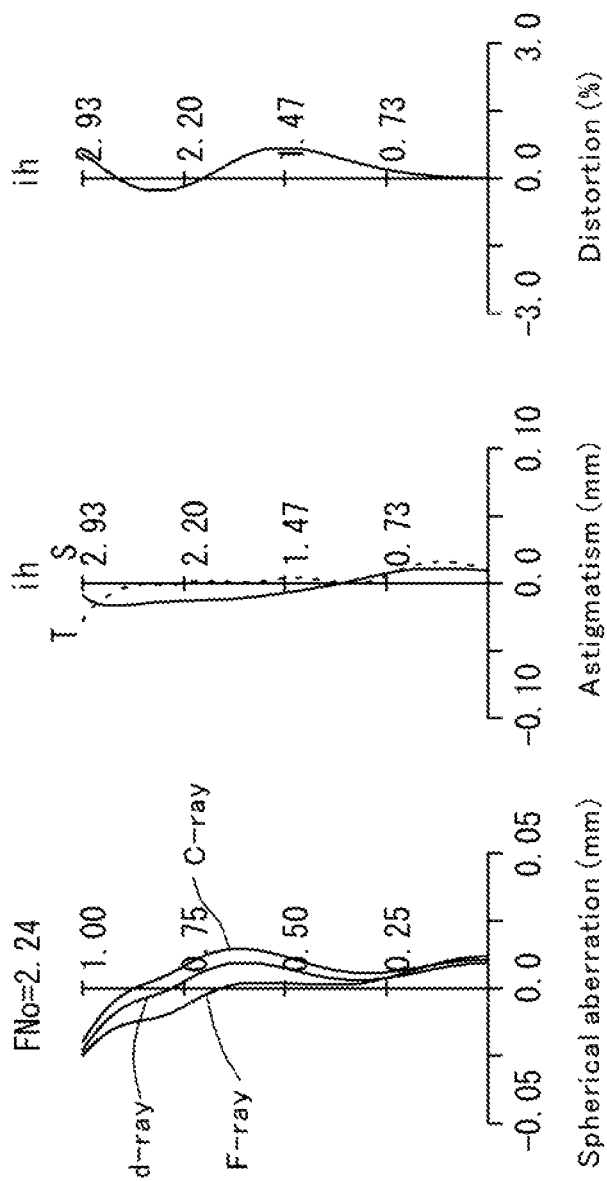
FIG. 4 shows spherical aberration, astigmatism, and distortion of the imaging lens in Example 2.
Figure 5:
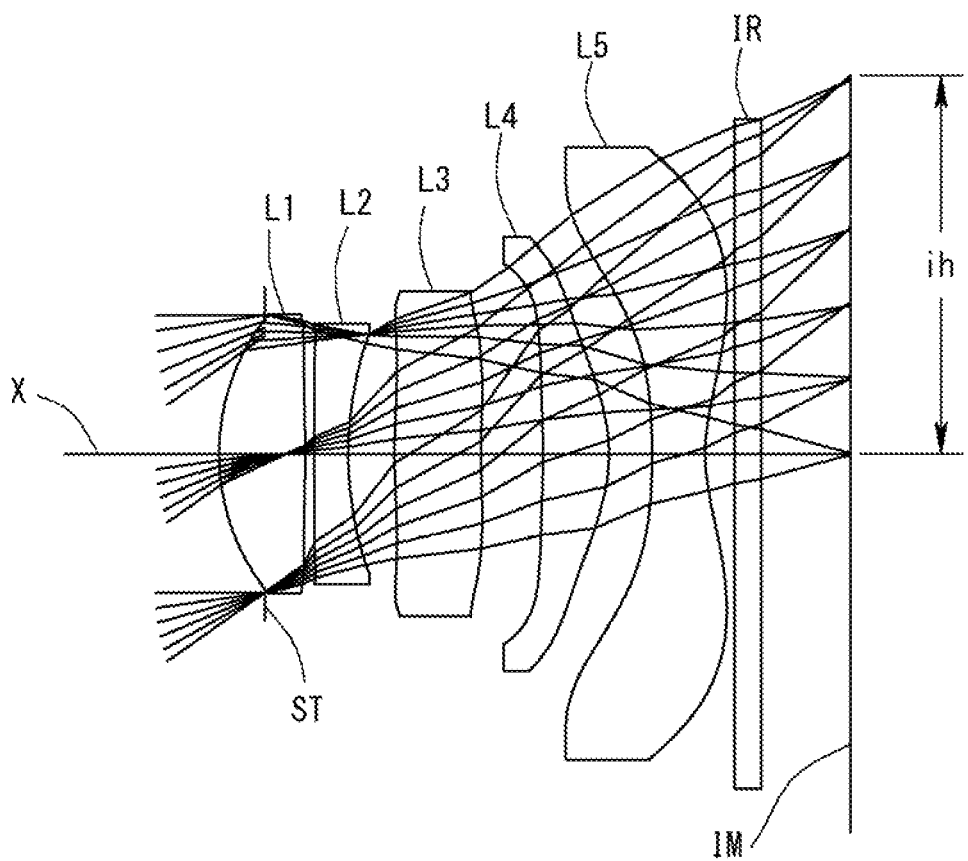
FIG. 5 is a schematic view showing the general configuration of an imaging lens in Example 3 according to the embodiment.

FIG. 4 shows spherical aberration (mm), astigmatism (mm), and distortion (%) of the imaging lens in Example 2. As shown in FIG. 4, each aberration is corrected properly.

EXAMPLE 3

The basic lens data of Example 3 is shown below in Table 3.

TABLE 3

Numerical Data Example 3
Unit mm f = 4.116
Fno = 1.89
ω (°) = 35.3
ih = 2.934
TTL = 4.872

Surface Data

| Surface Number i | Curvature Radius r | Surface Distance d | Refractive Index Nd | Abbe Number vd |
|---|---|---|---|---|
| (Object) | Infinity | Infinity |  |  |
| 1 (Stop) | Infinity | −0.355 |  |  |
| 2* | 1.761 | 0.672 | 1.5438 | 55.57 |
| 3* | −23.473 | 0.072 |  |  |
| 4* | 12.642 | 0.264 | 1.6349 | 23.97 |
| 5* | 2.244 | 0.363 |  |  |
| 6* | 5.145 | 0.679 | 1.5346 | 56.16 |
| 7* | 11.921 | 0.486 |  |  |
| 8* | −11.000 | 0.517 | 1.5438 | 55.57 |
| 9* | −1.299 | 0.337 |  |  |
| 10* | −5.600 | 0.416 | 1.5346 | 56.16 |
| 11* | 1.484 | 0.227 |  |  |
| 12 | Infinity | 0.210 | 1.5168 | 64.20 |
| 13 | Infinity | 0.695 |  |  |
| Image Plane | Infinity |  |  |  |

Constituent Lens Data

| Lens | Start Surface | Focal Length |
|---|---|---|
| 1 | 2 | 3.041 |
| 2 | 4 | −4.339 |

TABLE 3-continued

Numerical Data Example 3
Unit mm

| | | |
|---|---|---|
| 3 | 6 | 16.358 |
| 4 | 8 | 2.659 |
| 5 | 10 | −2.150 |

Telephoto Ratio

TTL/f = 1.184

Aspheric Surface Data

| | 2nd Surface | 3rd Surface | 4th Surface | 5th Surface | 6th Surface | 7th Surface |
|---|---|---|---|---|---|---|
| k   | 7.054E−01  | 0.000E+00  | 0.00E+00   | −9.530E+00 | 1.671E+01  | 0.000E+00  |
| A4  | −8.459E−03 | −7.177E−02 | −2.307E−01 | −1.142E−01 | −1.525E−01 | −7.901E−02 |
| A6  | −1.350E−02 | 3.202E−01  | 6.381E−01  | 3.343E−01  | 4.911E−02  | 1.855E−03  |
| A8  | −4.763E−03 | −6.204E−01 | −9.930E−01 | −3.530E−01 | −5.117E−02 | −1.749E−02 |
| A10 | −1.297E−03 | 8.088E−01  | 1.101E+00  | 2.676E−01  | 6.746E−02  | 1.546E−02  |
| A12 | 1.951E−02  | −6.098E−01 | −7.857E−01 | −1.589E−01 | −2.733E−02 | 0.000E+00  |
| A14 | −1.568E−02 | 1.774E−01  | 2.355E−01  | 5.025E−02  | 0.000E+00  | 0.000E+00  |
| A16 | 0.000E+00  | 0.000E+00  | 0.000E+00  | 0.000E+00  | 0.000E+00  | 0.000E+00  |

| | 8th Surface | 9th Surface | 10th Surface | 11th Surface |
|---|---|---|---|---|
| k   | 0.000E+00  | −4.989E+00 | 0.000E+00  | −9.190E+00 |
| A4  | 2.852E−02  | −1.791E−02 | −8.610E−02 | −7.708E−02 |
| A6  | −1.802E−03 | 5.383E−02  | 1.479E−02  | 2.425E−02  |
| A8  | −2.316E−02 | −2.953E−02 | 2.929E−03  | −6.025E−03 |
| A10 | 7.417E−03  | 4.940E−03  | −7.563E−04 | 8.001E−04  |
| A12 | −1.358E−03 | −2.359E−04 | 4.008E−05  | −5.848E−05 |
| A14 | 0.000E+00  | 0.000E+00  | 0.000E+00  | 2.362E−06  |
| A16 | 0.000E+00  | 0.000E+00  | 0.000E+00  | 0.000E+00  |

As shown in Table 10, the imaging lens in Example 3 satisfies conditional expressions (1) to (15).

Figure 6:
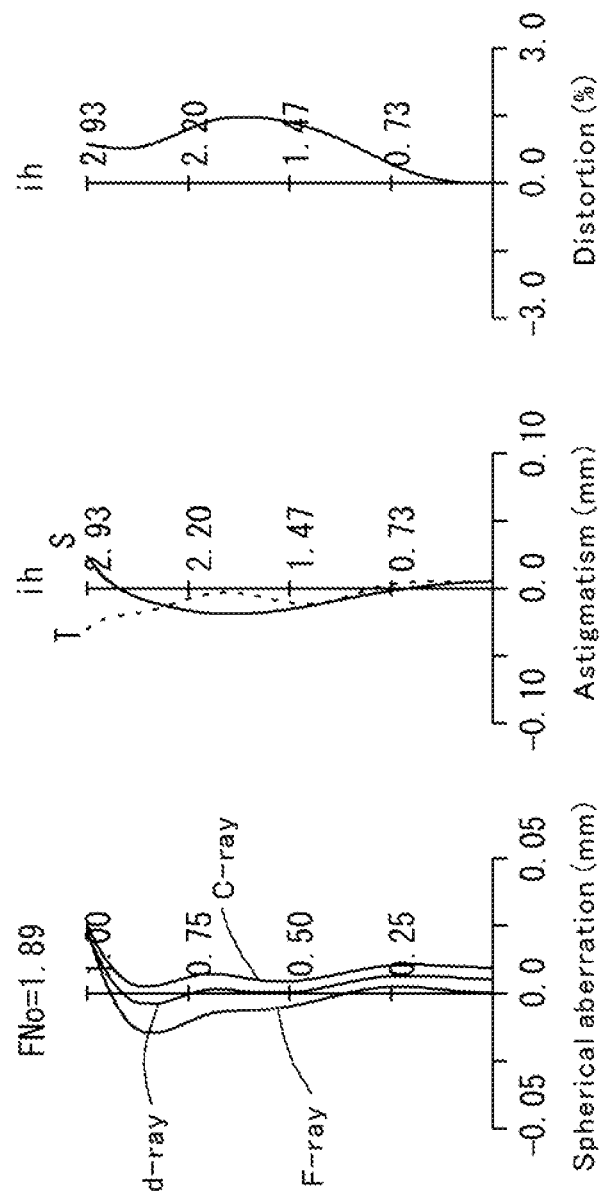
FIG. 6 shows spherical aberration, astigmatism, and distortion of the imaging lens in Example 3.
Figure 7:
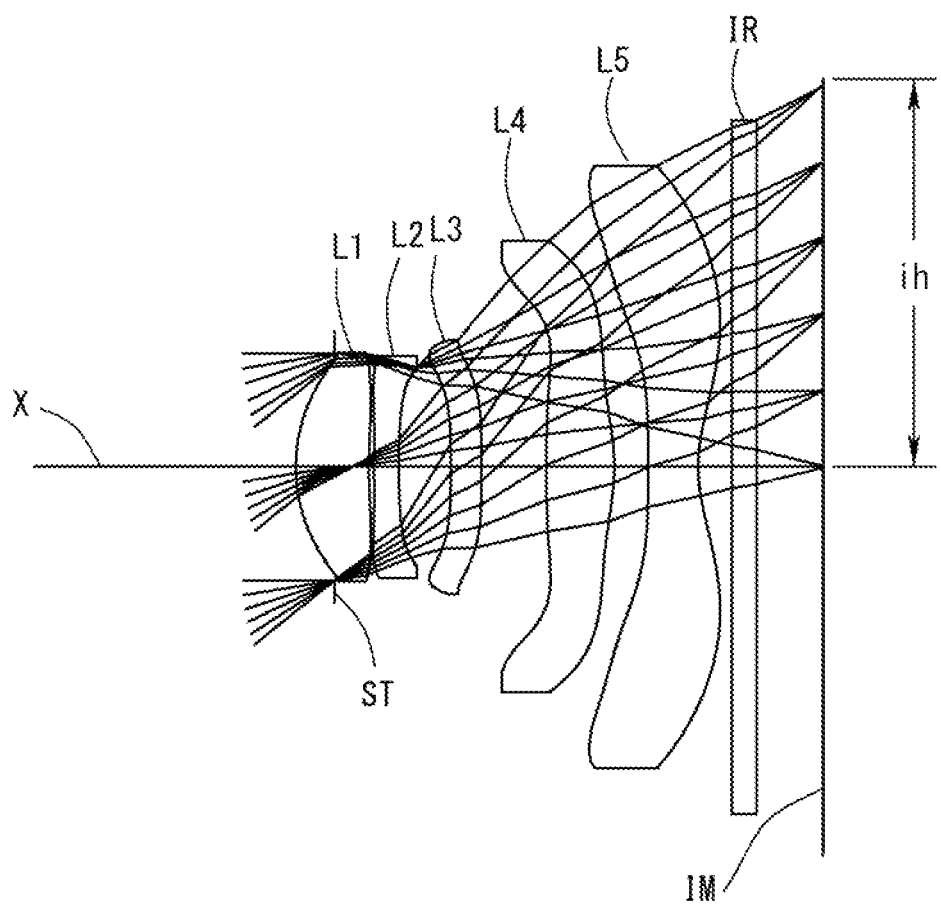
FIG. 7 is a schematic view showing the general configuration of an imaging lens in Example 4 according to the embodiment.

FIG. 6 shows spherical aberration (mm), astigmatism (mm), and distortion (%) of the imaging lens in Example 3. As shown in FIG. 6, each aberration is corrected properly.

EXAMPLE 4

The basic lens data of Example 4 is shown below in Table 4.

TABLE 4

Numerical Data Example 4
Unit mm f = 3.996
Fno = 2.06
ω (°) = 38.8
ih = 3.261
TTL = 4.431

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.330 | | |
| 2 | 1.389 | 0.623 | 1.5438 | 55.57 |
| 3* | 4.228 | 0.045 | | |
| 4* | 16.387 | 0.210 | 1.6499 | 21.53 |
| 5* | 5.684 | 0.443 | | |
| 6* | −29.317 | 0.269 | 1.5348 | 55.66 |
| 7* | −300.000 | 0.553 | | |
| 8* | 30.528 | 0.579 | 1.5438 | 55.57 |
| 9* | −1.833 | 0.291 | | |
| 10* | −21.203 | 0.425 | 1.5348 | 55.66 |
| 11* | 1.354 | 0.300 | | |
| 12 | Infinity | 0.210 | 1.5168 | 64.20 |
| 13 | Infinity | 0.561 | | |
| Image Plane | Infinity | | | |

TABLE 4-continued

Numerical Data Example 4
Unit mm

Constituent Lens Data

| Lens | Start Surface | Focal Length |
|---|---|---|
| 1 | 2 | 3.531 |
| 2 | 4 | −13.494 |
| 3 | 6 | −60.776 |
| 4 | 8 | 3.200 |
| 5 | 10 | −2.364 |

Telephoto Ratio

TTL/f = 1.109

Aspheric Surface Data

|  | 2nd Surface | 3rd Surface | 4th Surface | 5th Surface | 6th Surface | 7th Surface |
|---|---|---|---|---|---|---|
| k   | −1.074E+00 | 0.000E+00  | 0.000E+00  | −3.597E+00 | 0.000E+00  | 0.000E+00 |
| A4  | 3.669E−02  | −2.176E−01 | −2.298E−01 | −2.663E−02 | −2.511E−01 | −2.448E−01 |
| A6  | 8.608E−02  | −4.573E−01 | −1.711E−01 | 2.063E−01  | −1.408E−01 | 1.722E−01 |
| A8  | −2.121E−01 | 2.315E+00  | 2.579E+00  | 6.038E−01  | 4.578E−01  | −8.510E−01 |
| A10 | 3.025E−01  | −3.884E+00 | −5.677E+00 | −1.334E−01 | −5.571E−01 | 2.154E+00 |
| A12 | −2.132E−01 | 3.213E+00  | 6.113E+00  | 1.755E−01  | −1.836E−01 | −2.893E+00 |
| A14 | 1.884E−02  | −1.325E+00 | −3.259E+00 | 1.845E+00  | 8.593E−01  | 2.012E+00 |
| A16 | 0.00E+00   | 2.033E−01  | 6.814E−01  | −1.176E+00 | −3.382E−01 | −5.385E−01 |

|  | 8th Surface | 9th Surface | 10th Surface | 11th Surface |
|---|---|---|---|---|
| k   | 3.037E+01  | −8.406E+00 | 0.000E+00  | −6.775E+00 |
| A4  | 1.072E−01  | 1.704E−01  | −5.379E−02 | −9.370E−02 |
| A6  | −8.508E−02 | −7.184E−02 | −6.595E−02 | 3.061E−02 |
| A8  | −3.766E−02 | −2.608E−02 | 7.353E−02  | −8.226E−03 |
| A10 | 6.257E−02  | 2.688E−02  | −2.837E−02 | 1.588E−03 |
| A12 | −3.956E−02 | −7.899E−03 | 5.391E−03  | −1.780E−04 |
| A14 | 1.239E−02  | 9.167E−04  | −5.098E−04 | 8.359E−06 |
| A16 | −1.448E−03 | −2.685E−05 | 1.923E−05  | −1.446E−08 |

As shown in Table 10, the imaging lens in Example 4 satisfies conditional expressions (1) to (15).

Figure 8:
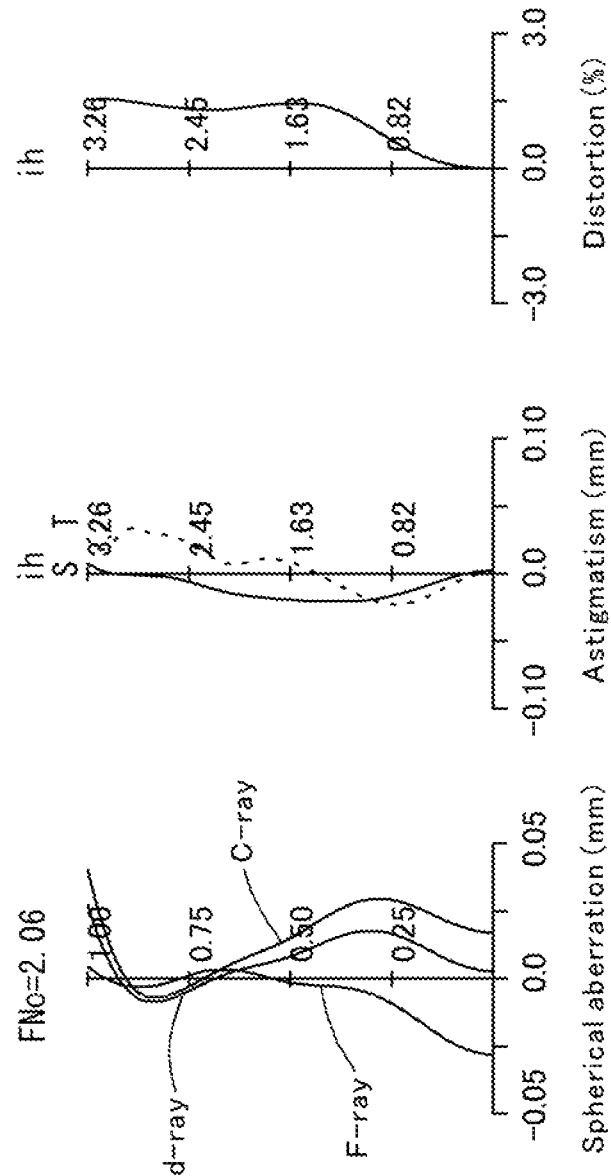
FIG. 8 shows spherical aberration, astigmatism, and distortion of the imaging lens in Example 4.
Figure 9:
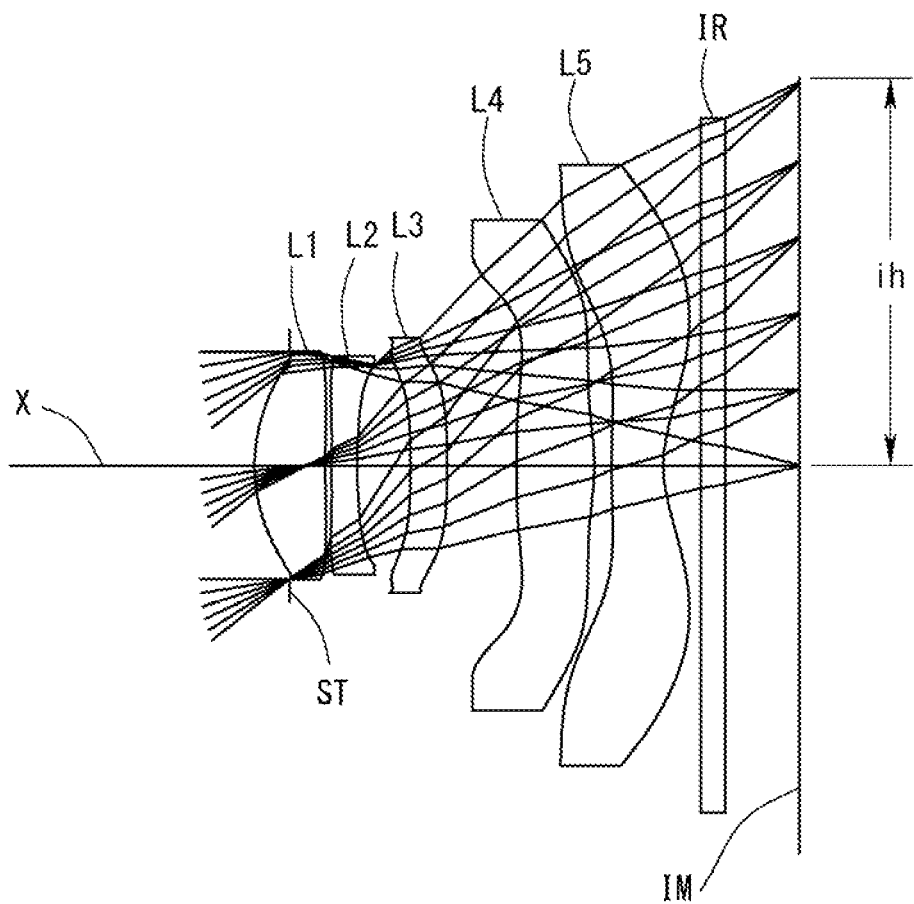
FIG. 9 is a schematic view showing the general configuration of an imaging lens in Example 5 according to the embodiment.

FIG. 8 shows spherical aberration (mm), astigmatism (mm), and distortion (%) of the imaging lens in Example 4. As shown in FIG. 8, each aberration is corrected properly.

EXAMPLE 5

The basic lens data of Example 5 is shown below in Table 5.

TABLE 5

Numerical Data Example 5
Unit mm f = 4.043
Fno = 2.08
ω (°) = 38.5
ih = 3.261
TTL = 4.579

Surface Data

| Surface Number i | Curvature Radius r | Surface Distance d | Refractive Index Nd | Abbe Number νd |
|---|---|---|---|---|
| (Object) | Infinity | Infinity |  |  |
| 1 (Stop) | Infinity | −0.295 |  |  |
| 2* | 1.486 | 0.600 | 1.5438 | 55.57 |
| 3* | 6.059 | 0.056 |  |  |
| 4* | 18.484 | 0.218 | 1.6499 | 21.53 |
| 5* | 4.892 | 0.452 |  |  |
| 6* | −14.483 | 0.314 | 1.5348 | 55.66 |
| 7* | −11.043 | 0.596 |  |  |
| 8* | 12.799 | 0.664 | 1.5438 | 55.57 |
| 9* | −2.044 | 0.148 |  |  |
| 10* | 8.352 | 0.442 | 1.5348 | 55.66 |
| 11* | 1.084 | 0.300 |  |  |
| 12 | Infinity | 0.210 | 1.5168 | 64.20 |

TABLE 5-continued

Numerical Data Example 5
Unit mm

| 13 | Infinity | 0.657 |
| Image Plane | Infinity | |

Constituent Lens Data

| Lens | Start Surface | Focal Length |
|---|---|---|
| 1 | 2 | 3.462 |
| 2 | 4 | −10.302 |
| 3 | 6 | 84.264 |
| 4 | 8 | 3.293 |
| 5 | 10 | −2.380 |

Telephoto Ratio

TTL/f = 1.133

Aspheric Surface Data

| | 2nd Surface | 3rd Surface | 4th Surface | 5th Surface | 6th Surface | 7th Surface |
|---|---|---|---|---|---|---|
| k   | −1.344E−00 | 0.000E+00  | 0.000E+00  | −2.670E+01 | 0.000E+00  | 0.000E+00  |
| A4  | 4.030E−02  | −2.313E−01 | −2.629E−01 | −4.550E−02 | −2.439E−01 | −2.094E−01 |
| A6  | 4.273E−02  | 5.078E−02  | 3.760E−01  | 4.477E−01  | 1.796E−01  | 9.685E−02  |
| A8  | −8.874E−02 | 6.704E−01  | 3.821E−01  | −9.168E−01 | −1.084E+00 | −5.197E−01 |
| A10 | 7.367E−02  | −1.422E+00 | −1.310E+00 | 2.842E+00  | 3.617E+00  | 1.362E+00  |
| A12 | −3.360E−02 | 1.213E+00  | 1.168E+00  | −5.924E+00 | −6.383E+00 | −1.793E+00 |
| A14 | −2.225E−02 | −4.396E−01 | −2.053E−01 | 6.420E+00  | 5.705E+00  | 1.193E+00  |
| A16 | 0.000E+00  | 2.752E−02  | −1.317E−01 | −2.649E+00 | −1.914E+00 | −2.956E−01 |

| | 8th Surface | 9th Surface | 10th Surface | 11th Surface |
|---|---|---|---|---|
| k   | 3.037E+01  | −1.077E+01 | 0.000E+00  | −6.378E+00 |
| A4  | 1.193E−01  | 3.171E−01  | −7.693E−02 | −9.603E−02 |
| A6  | −1.733E−01 | −3.293E−01 | −4.885E−02 | 3.270E−02  |
| A8  | 6.656E−02  | 1.824E−01  | 4.331E−02  | −9.903E−03 |
| A10 | 7.410E−03  | −6.522E−02 | −1.259E−02 | 2.045E−03  |
| A12 | −2.235E−02 | 1.436E−02  | 1.804E−03  | −2.340E−04 |
| A14 | 8.810E−03  | −1.724E−03 | −1.275E−04 | 1.155E−05  |
| A16 | −1.073E−03 | 8.529E−05  | 3.463E−06  | −7.844E−08 |

As shown in Table 10, the imaging lens in Example 5 satisfies conditional expressions (1) to (15).

Figure 10:
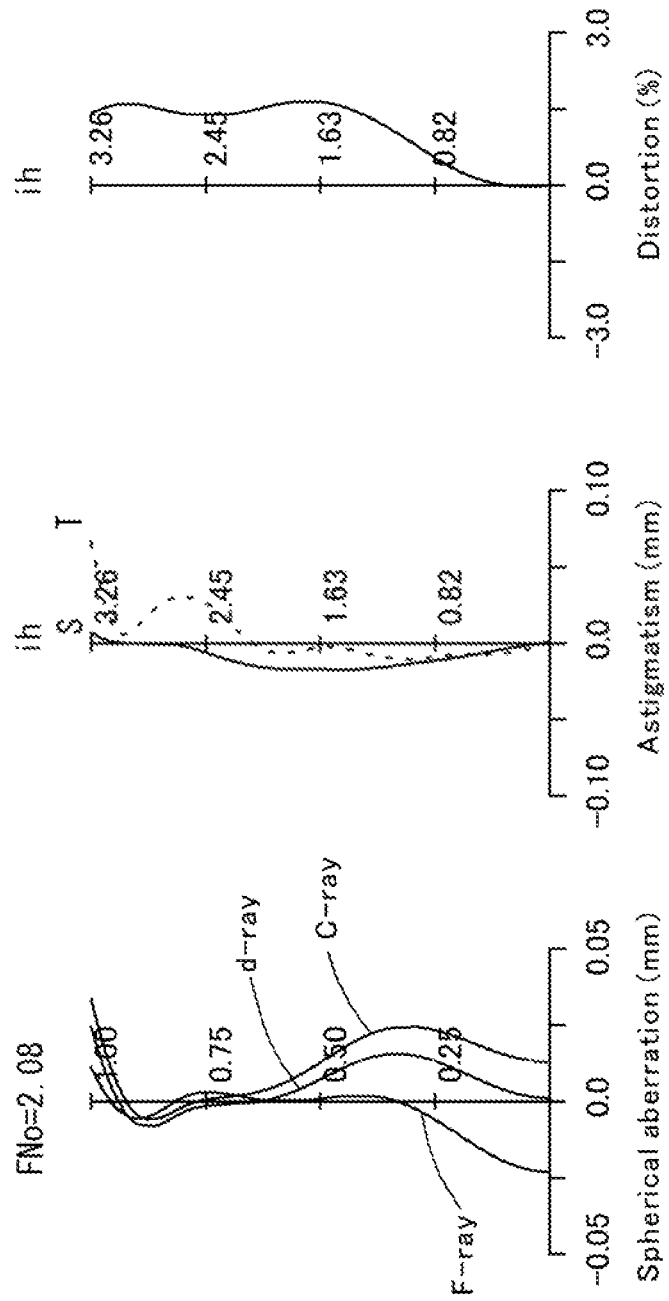
FIG. 10 shows spherical aberration, astigmatism, and distortion of the imaging lens in Example 5.
Figure 11:
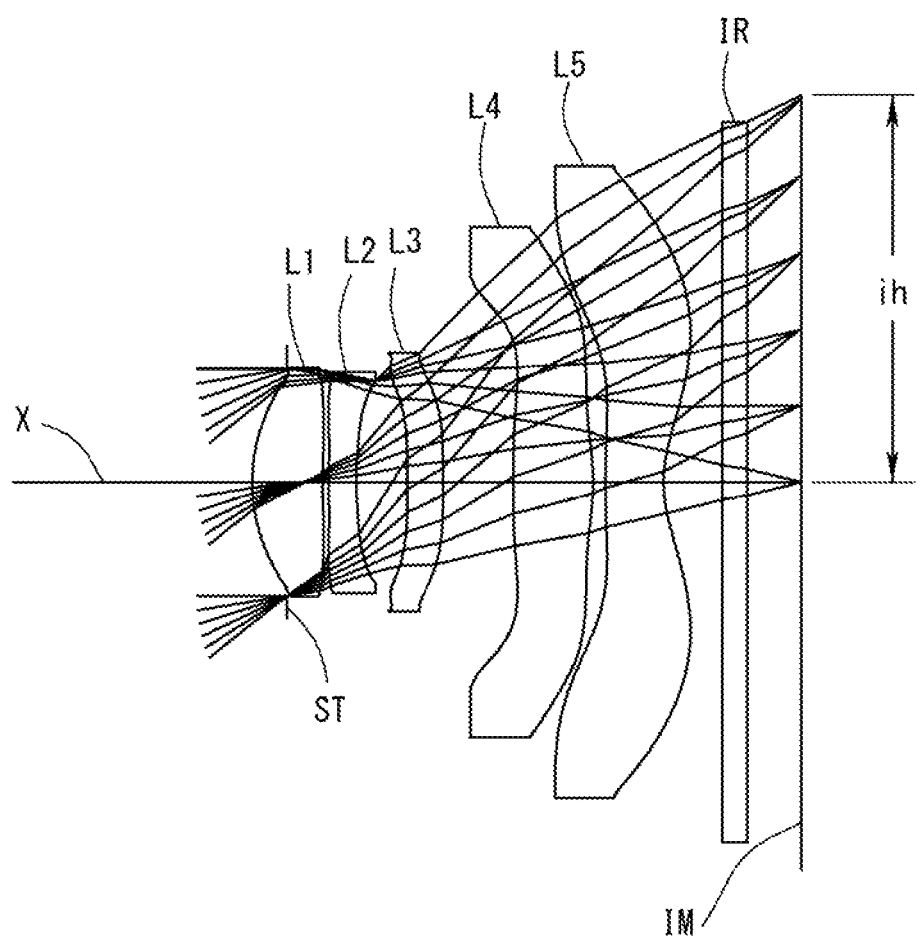
FIG. 11 is a schematic view showing the general configuration of an imaging lens in Example 6 according to the embodiment.
Figure 12:
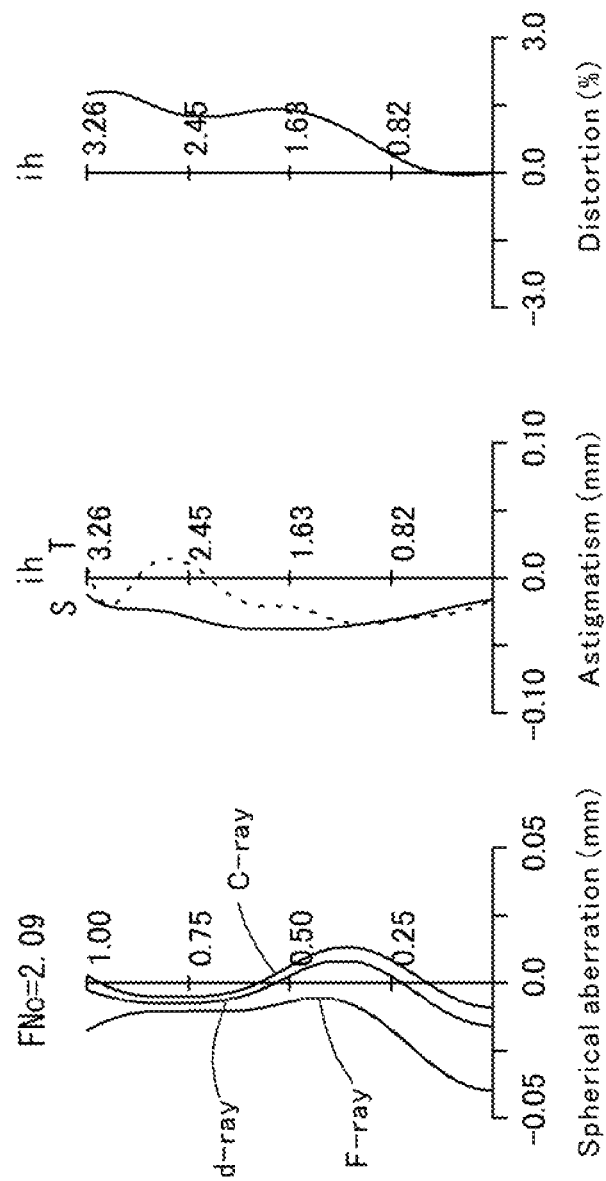
FIG. 12 shows spherical aberration, astigmatism, and distortion of the imaging lens in Example 6.
Figure 13:
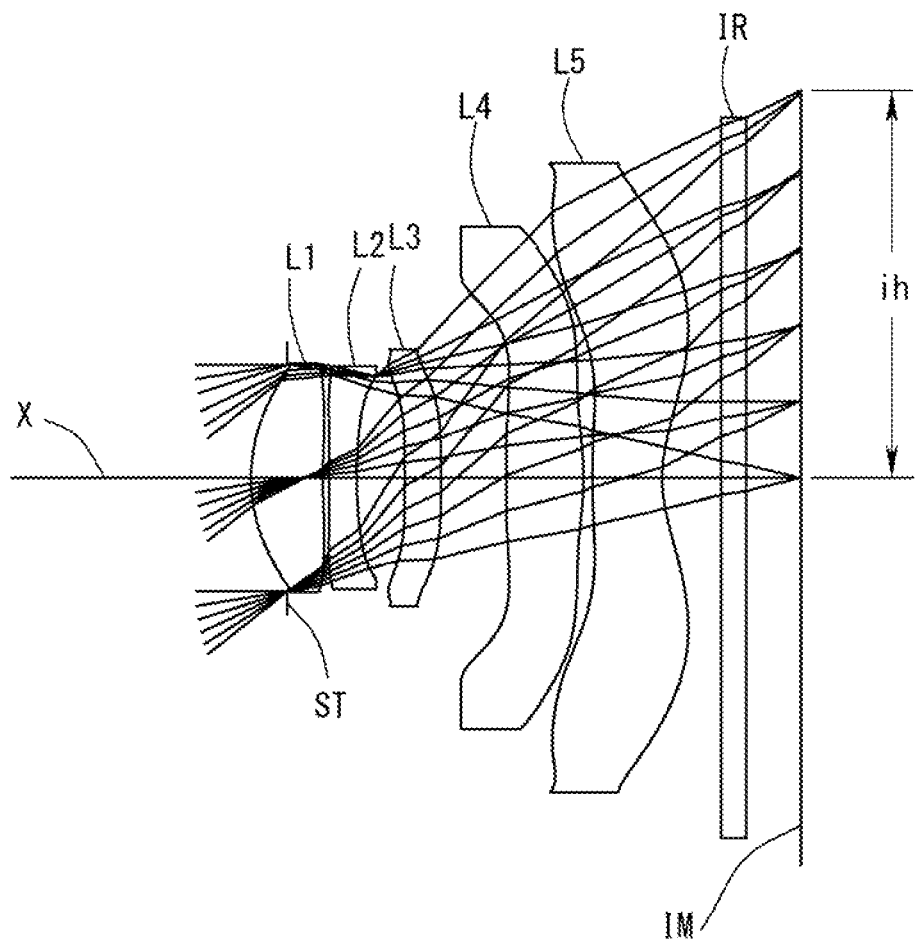
FIG. 13 is a schematic view showing the general configuration of an imaging lens in Example 7 according to the embodiment.

FIG. 10 shows spherical aberration (mm), astigmatism (mm), and distortion (%) of the imaging lens in Example 5. As shown in FIG. 10, each aberration is corrected properly.

EXAMPLE 6

The basic lens data of Example 6 is shown below in Table 6.

TABLE 6

Numerical Data Example 6
Unit mm f = 4.020
Fno = 2.09
ω (°) = 38.5
ih = 3.261
TTL = 4.568

Surface Data

| Surface Number i | Curvature Radius r | Surface Distance d | Refractive index Nd | Abbe Number vd |
|---|---|---|---|---|
| (Object) | Infinity | Infinity | | |
| 1 (Stop) | Infinity | −0.297 | | |
| 2* | 1.479 | 0.598 | 1.5438 | 55.57 |
| 3* | 6.925 | 0.051 | | |
| 4* | 13.999 | 0.235 | 1.6391 | 23.25 |
| 5* | 3.987 | 0.429 | | |
| 6* | −27.561 | 0.310 | 1.5348 | 55.66 |
| 7* | −15.424 | 0.591 | | |
| 8* | 20.185 | 0.676 | 1.5438 | 55.57 |
| 9* | −1.987 | 0.105 | | |
| 10* | 6.632 | 0.491 | 1.5348 | 55.66 |

TABLE 6-continued

Numerical Data Example 6
Unit mm

| | | | | |
|---|---|---|---|---|
| 11* | 1.061 | 0.500 | | |
| 12 | Infinity | 0.210 | 1.5168 | 64.20 |
| 13 | Infinity | 0.460 | | |
| Image Plane | Infinity | | | |

Constituent Lens Data

| Lens | Start Surface | Focal Length |
|---|---|---|
| 1 | 2 | 3.329 |
| 2 | 4 | −8.805 |
| 3 | 6 | 64.911 |
| 4 | 8 | 3.362 |
| 5 | 10 | −2.435 |

Telephoto Ratio

TTL/f = 1.136

Aspheric Surface Data

| | 2nd Surface | 3rd Surface | 4th Surface | 5th Surface | 6th Surface | 7th Surface |
|---|---|---|---|---|---|---|
| k | −1.285E+00 | 0.000E+00 | 0.000E+00 | −8.315E+00 | 0.000E+00 | 0.000E+00 |
| A4 | 4.054E−02 | −2.243E−01 | −2.605E−01 | −4.713E−02 | −2.380E−01 | −2.040E−01 |
| A6 | 3.976E−02 | 6.678E−02 | 3.780E−01 | 4.073E−01 | 1.642E−01 | 9.471E−02 |
| A8 | −9.090E−02 | 6.807E−01 | 3.805E−01 | −8.723E−01 | −1.063E+00 | −5.197E+01 |
| A10 | 8.105E−02 | −1.444E+00 | −1.298E+00 | 2.862E+00 | 3.633E+00 | 1.362E+00 |
| A12 | −3.128E−02 | 1.188E+00 | 1.152E+00 | −5.963E+00 | −6.408E+00 | −1.788E+00 |
| A14 | −2.739E−02 | −4.297E−01 | −2.754E−01 | 6.385E+00 | 5.683E+00 | 1.193E+00 |
| A16 | 0.000E+00 | 4.058E−02 | −6.600E−02 | −2.619E+00 | −1.894E+00 | −2.998E−01 |

| | 8th Surface | 9th Surface | 10th Surface | 11th Surface |
|---|---|---|---|---|
| k | 3.642E+01 | −1.003E+01 | 0.000E+00 | −6.308E+00 |
| A4 | 1.268E−01 | 3.179E−01 | −7.767E−02 | −9.351E−02 |
| A6 | −1.755E−01 | −3.311E−01 | −4.952E−02 | 3.193E−02 |
| A8 | 6.600E−02 | 1.830E−01 | 4.322E−02 | −9.814E−03 |
| A10 | 7.642E−03 | −6.521E−02 | −1.258E−02 | 2.044E−03 |
| A12 | −2.219E−02 | 1.434E−02 | 1.808E−03 | −2.345E−04 |
| A14 | 8.836E−03 | −1.727E−03 | −1.274E−04 | 1.156E−05 |
| A16 | −1.092E−03 | 8.621E−05 | 3.393E−06 | −8.227E−08 |

As shown in Table 10, the imaging lens in Example 6 satisfies conditional expressions (1) to (15).

EXAMPLE 7

The basic lens data of Example 7 is shown below in Table 7.

TABLE 7

Numerical Data Example 7
Unit mm f = 4.015
Fno = 2.09
ω (°) = 38.5
ih = 3.261
TTL = 4.564

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.306 | | |
| 2* | 1.452 | 0.607 | 1.5438 | 55.57 |
| 3* | 6.566 | 0.050 | | |
| 4* | 13.775 | 0.235 | 1.6391 | 23.25 |
| 5* | 3.959 | 0.407 | | |

TABLE 7-continued

Numerical Data Example 7
Unit mm

| | | | | |
|---|---|---|---|---|
| 6* | −49.023 | 0.305 | 1.5348 | 55.66 |
| 7* | −21.904 | 0.560 | | |
| 8* | 70.555 | 0.652 | 1.5438 | 55.57 |
| 9* | −2.233 | 0.075 | | |
| 10* | 5.936 | 0.590 | 1.5348 | 55.66 |
| 11* | 1.176 | 0.500 | | |
| 12 | Infinity | 0.210 | 1.5168 | 64.20 |
| 13 | Infinity | 0.463 | | |
| Image Plane | Infinity | | | |

Constituent Lens Data

| Lens | Start Surface | Focal Length |
|---|---|---|
| 1 | 2 | 3.292 |
| 2 | 4 | −8.776 |
| 3 | 6 | 73.749 |
| 4 | 8 | 3.992 |
| 5 | 10 | −2.865 |

Telephoto Ratio

TTL/f = 1.137

Aspheric Surface Data

| | 2nd Surface | 3rd Surface | 4th Surface | 5th Surface | 6th Surface | 7th Surface |
|---|---|---|---|---|---|---|
| k | −1.249E+00 | 0.000E+00 | 0.000E+00 | −7.564E+00 | 0.000E+00 | 0.000E+00 |
| A4 | 4.231E−02 | −2.284E−01 | −2.614E−01 | −4.462E−02 | −2.381E−01 | −2.000E−01 |
| A6 | 3.863E−02 | 8.173E−02 | 3.963E−01 | 4.093E−01 | 1.645E−01 | 8.782E−02 |
| A8 | −8.581E−02 | 6.825E−01 | 3.717E−01 | −8.499E−01 | −1.075E+00 | −5.079E−01 |
| A10 | 8.593E−02 | −1.465E+00 | −1.309E+00 | 2.844E+00 | 3.678E+00 | 1.357E+00 |
| A12 | −4.355E−02 | 1.174E+00 | 1.151E+00 | −5.997E+00 | −6.391E+00 | −1.787E+00 |
| A14 | −2.169E−02 | −4.016E−01 | −2.889E−01 | 6.432E+00 | 5.540E+00 | 1.198E+00 |
| A16 | 0.000E+00 | 3.596E−02 | −4.053E−02 | −2.624E+00 | −1.804E+00 | −3.057E−01 |

| | 8th Surface | 9th Surface | 10th Surface | 11th Surface |
|---|---|---|---|---|
| k | −7.902E+01 | −7.175E+00 | 0.000E+00 | −6.465E+00 |
| A4 | 1.344E−01 | 3.241E−01 | −7.699E−02 | −8.796E−02 |
| A6 | −1.837E−01 | −3.337E−01 | −4.928E−02 | 3.043E−02 |
| A8 | 6.909E−02 | 1.834E−01 | 4.321E−02 | −9.774E−03 |
| A10 | 6.828E−03 | −6.513E−02 | −1.258E−02 | 2.054E−03 |
| A12 | −2.225E−02 | 1.433E−02 | 1.807E−03 | −2.336E−04 |
| A14 | 8.952E−03 | −1.731E−03 | −1.275E−04 | 1.158E−05 |
| A16 | −1.105E−03 | 8.645E−05 | 3.433E−06 | −9.435E−08 |

As shown in Table 10, the imaging lens in Example 7 satisfies conditional expressions (1) to (15).

Figure 14:
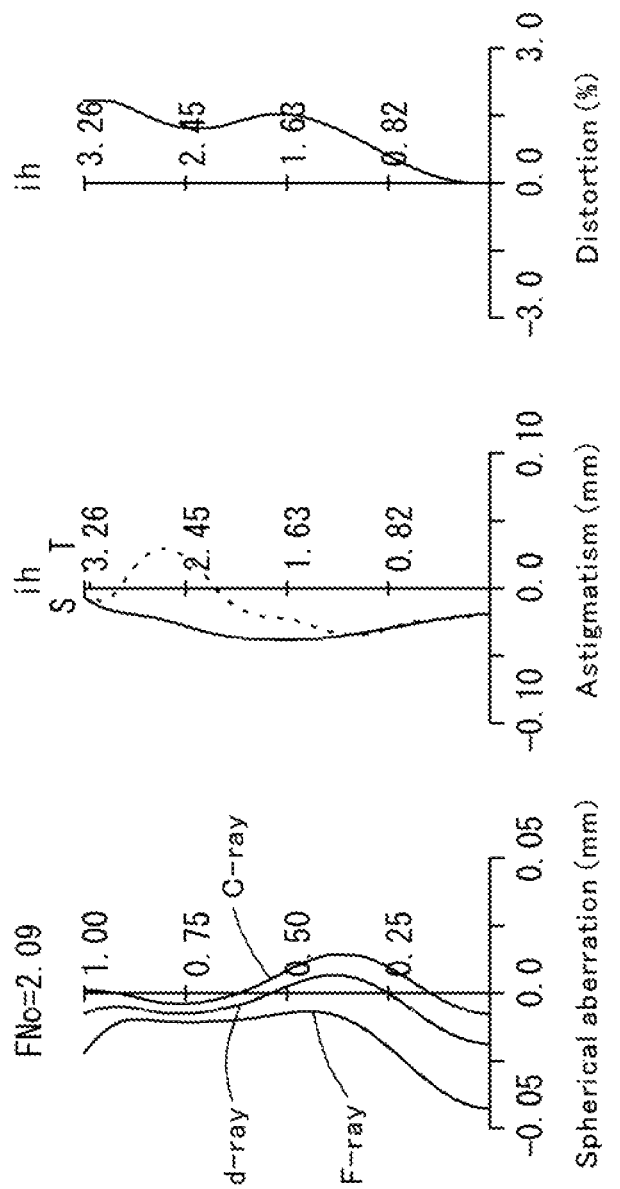
FIG. 14 shows spherical aberration, astigmatism, and distortion of the imaging lens in Example 7.
Figure 15:
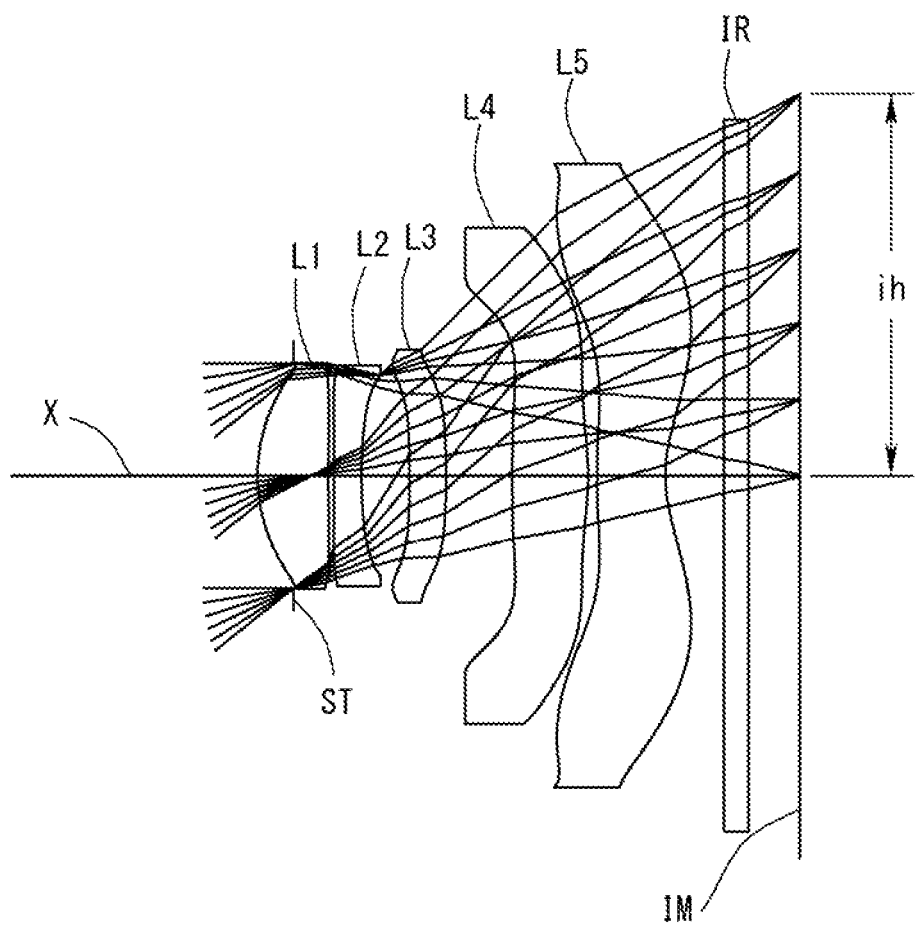
FIG. 15 is a schematic view showing the general configuration of an imaging lens in Example 8 according to the embodiment.

FIG. 14 shows spherical aberration (mm), astigmatism (mm), and distortion (%) of the imaging lens in Example 7. As shown in FIG. 14, each aberration is corrected properly.

EXAMPLE 8

The basic lens data of Example 8 is shown below in Table 8.

TABLE 8

Numerical Data Example 8
Unit mm f = 4.008
Fno = 2.09
ω (°) = 38.5
ih = 3.261
TTL = 4.561

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.307 | | |
| 2* | 1.456 | 0.601 | 1.5438 | 55.57 |
| 3* | 6.812 | 0.048 | | |

TABLE 8-continued

Numerical Data Example 8
Unit mm

| | | | | |
|---|---|---|---|---|
| 4* | 14.147 | 0.235 | 1.6391 | 23.25 |
| 5* | 3.912 | 0.409 | | |
| 6* | −45.331 | 0.311 | 1.5348 | 55.66 |
| 7* | −17.673 | 0.574 | | |
| 8* | 65.750 | 0.646 | 1.5438 | 55.57 |
| 9* | −2.260 | 0.077 | | |
| 10* | 5.890 | 0.581 | 1.5348 | 55.66 |
| 11* | 1.174 | 0.500 | | |
| 12 | Infinity | 0.210 | 1.5168 | 64.20 |
| 13 | Infinity | 0.463 | | |
| Image Plane | Infinity | | | |

Constituent Lens Data

| Lens | Start Surface | Focal Length |
|---|---|---|
| 1 | 2 | 3.277 |
| 2 | 4 | −8.536 |
| 3 | 6 | 53.951 |
| 4 | 8 | 4.031 |
| 5 | 10 | −2.864 |

Telephoto Ratio

TTL/f = 1.138

Aspheric Surface Data

| | 2nd Surface | 3rd Surface | 4th Surface | 5th Surface | 6th Surface | 7th Surface |
|---|---|---|---|---|---|---|
| k | −1.231E+00 | 0.000E+00 | 0.000E+00 | −7.719E+00 | 0.000E+00 | 0.000E+00 |
| A4 | 4.261E−02 | −2.261E−01 | −2.641E−01 | −4.622E−02 | −2.387E−01 | −1.995E−01 |
| A6 | 3.884E−02 | 8.193E−02 | 3.966E−01 | 3.997E−01 | 1.647E−01 | 8.611E−02 |
| A8 | −8.635E−02 | 6.852E−01 | 3.687E−01 | −8.490E−01 | −1.077E+00 | −5.096E−01 |
| A10 | 8.711E−02 | −1.462E+00 | −1.308E+00 | 2.852E+00 | 3.646E+00 | 1.354E+00 |
| A12 | −4.133E−02 | 1.177E+00 | 1.161E+00 | −6.002E+00 | −6.366E+00 | −1.788E+00 |
| A14 | −2.312E−02 | −4.011E−01 | −2.777E−01 | 6.420E+00 | 5.553E+00 | 1.200E+00 |
| A16 | 0.000E+00 | 3.044E−02 | −6.036E−02 | −2.604E+00 | −1.805E+00 | −3.034E−01 |

| | 8th Surface | 9th Surface | 10th Surface | 11th Surface |
|---|---|---|---|---|
| k | −9.900E+01 | −7.703E+00 | 0.000E+00 | −6.449E+00 |
| A4 | 1.325E−01 | 3.234E−01 | −7.733E−02 | −8.862E−02 |
| A6 | −1.836E−01 | −3.341E−01 | −4.928E−02 | 3.034E−02 |
| A8 | 6.895E−02 | 1.835E−01 | 4.321E−02 | −9.764E−03 |
| A10 | 6.501E−03 | −6.512E−02 | −1.258E−02 | 2.056E−03 |
| A12 | −2.234E−02 | 1.433E−02 | 1.807E−03 | −2.335E−04 |
| A14 | 8.963E−03 | −1.732E−03 | −1.275E−04 | 1.158E−05 |
| A16 | −1.082E−03 | 8.641E−05 | 3.435E−06 | −9.661E−08 |

As shown in Table 10, the imaging lens in Example 8 satisfies conditional expressions (1) to (15).

Figure 16:
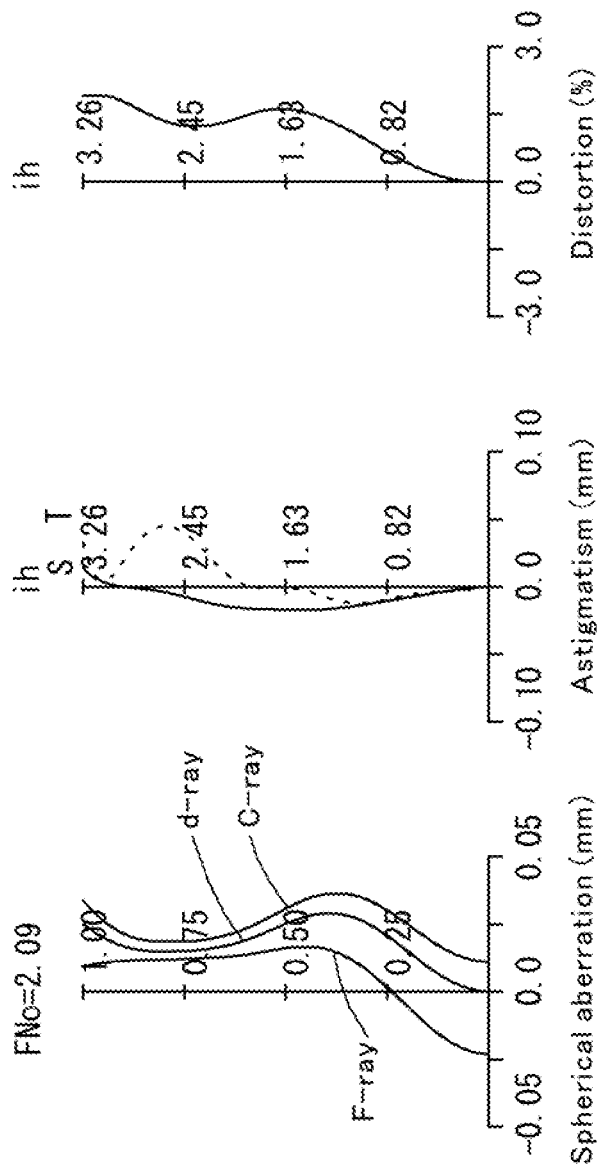
FIG. 16 shows spherical aberration, astigmatism, and distortion of the imaging lens in Example 8.
Figure 17:
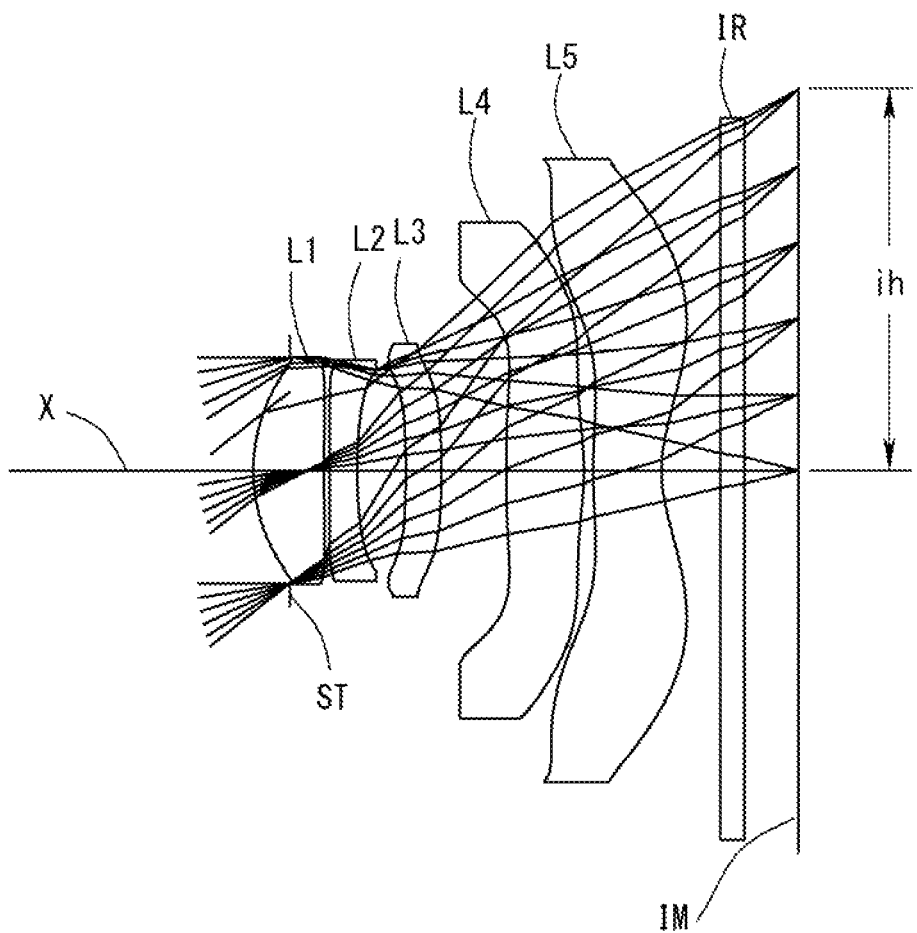
FIG. 17 is a schematic view showing the general configuration of an imaging lens in Example 9 according to the embodiment.

FIG. 16 shows spherical aberration (mm), astigmatism (mm), and distortion (%) of the imaging lens in Example 8. As shown in FIG. 16, each aberration is corrected properly.

EXAMPLE 9

The basic lens data of Example 9 is shown below in Table 9.

TABLE 9

Numerical Data Example 9
Unit mm f = 4.030
Fno = 2.09
ω (°) = 38.4
ih = 3.261
TTL = 4.575

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.309 | | |

TABLE 9-continued

Numerical Data Example 9
Unit mm

| | | | | |
|---|---|---|---|---|
| 2* | 1.454 | 0.599 | 1.5438 | 55.57 |
| 3* | 6.011 | 0.052 | | |
| 4* | 11.135 | 0.235 | 1.6503 | 21.54 |
| 5* | 3.984 | 0.413 | | |
| 6* | −28.836 | 0.310 | 1.5348 | 55.66 |
| 7* | −18.091 | 0.557 | | |
| 8* | 45.466 | 0.659 | 1.5438 | 55.57 |
| 9* | −2.257 | 0.081 | | |
| 10* | 6.204 | 0.580 | 1.5348 | 55.66 |
| 11* | 1.184 | 0.500 | | |
| 12 | Infinity | 0.210 | 1.5168 | 64.20 |
| 13 | Infinity | 0.465 | | |
| Image Plane | Infinity | | | |

Constituent Lens Data

| Lens | Start Surface | Focal Length |
|---|---|---|
| 1 | 2 | 3.372 |
| 2 | 4 | −9.665 |
| 3 | 6 | 89.872 |
| 4 | 8 | 3.974 |
| 5 | 10 | −2.852 |

Telephoto Ratio

TTL/f = 1.135

Aspheric Surface Data

| | 2nd Surface | 3rd Surface | 4th Surface | 5th Surface | 6th Surface | 7th Surface |
|---|---|---|---|---|---|---|
| k | −1.221E+00 | 0.000E+00 | 0.000E+00 | −1.114E+01 | 0.000E+00 | 0.000E+00 |
| A4 | 4.285E−02 | −2.288E−01 | −2.664E−01 | −4.846E−02 | −2.365E−01 | −1.999E−01 |
| A6 | 3.676E−02 | 7.823E−02 | 3.906E−01 | 4.099E−01 | 1.547E−01 | 8.300E−02 |
| A8 | −8.529E−02 | 6.788E−01 | 3.689E−01 | −8.519E−01 | −1.070E+00 | −5.070E−01 |
| A10 | 8.817E−02 | −1.461E+00 | −1.301E+00 | 2.844E+00 | 3.659E+00 | 1.354E+00 |
| A12 | −4.213E−02 | 1.188E+00 | 1.169E+00 | −5.992E+00 | −6.371E+00 | −1.789E+00 |
| A14 | −2.306E−02 | −3.894E−01 | −2.729E−01 | 6.434E+00 | 5.532E+00 | 1.201E+00 |
| A16 | 0.000E+00 | 1.377E−02 | −7.337E−02 | −2.616E+00 | −1.790E+00 | −3.049E−01 |

| | 8th Surface | 9th Surface | 10th Surface | 11th SurfaceP |
|---|---|---|---|---|
| k | 9.900E+01 | −7.086E+00 | 0.000E+00 | −6.504E+00 |
| A4 | 1.309E−01 | 3.258E−01 | −7.647E−02 | −8.871E−02 |
| A6 | −1.855E−01 | −3.346E−01 | −4.924E−02 | 3.026E−02 |
| A8 | 7.032E−02 | 1.834E−01 | 4.319E−02 | −9.753E−03 |
| A10 | 6.241E−03 | −6.511E−02 | −1.258E−02 | 2.056E−03 |
| A12 | −2.256E−02 | 1.433E−02 | 1.806E−03 | −2.336E−04 |
| A14 | 8.945E−03 | −1.731E−03 | −1.275E−04 | 1.156E−05 |
| A16 | −1.048E−03 | 8.623E−05 | 3.445E−06 | −1.005E−07 |

As shown in Table 10, the imaging lens in Example 9 satisfies conditional expressions (1) to (15).

Figure 18:
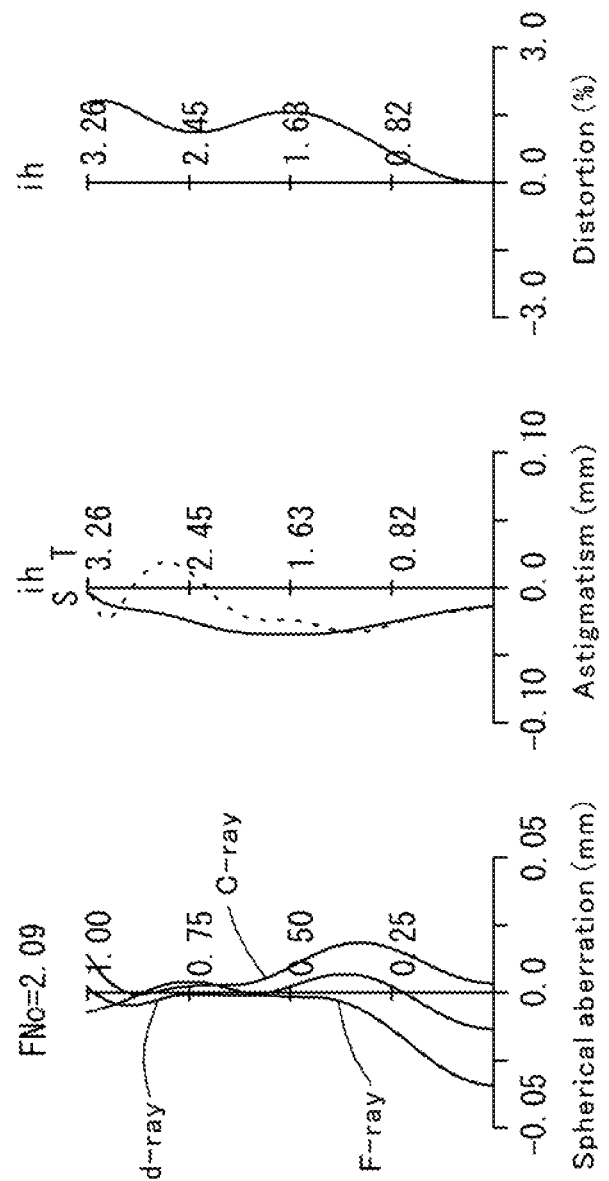
FIG. 18 shows spherical aberration, astigmatism, and distortion of the imaging lens in Example 9.

FIG. 18 shows spherical aberration (mm), astigmatism (mm), and distortion (%) of the imaging lens in Example 9. As shown in FIG. 18, each aberration is corrected properly.

As explained above, the imaging lens according to this embodiment of the present invention provides a compact high-resolution optical system which ensures low-profileness with a total track length of less than 5 mm, a telephoto ratio (TTL/f) of less than 1.2 and a TTL-to-diagonal ratio of less than 0.9, achieves high brightness with an F-value of 2.4 or less and a wide field of view of 70 to 78 degrees, and corrects various aberrations properly.

Table 10 shows data on Examples 1 to 9 in relation to the conditional expressions (1) to (15).

TABLE 10

| | Example 1 | Example 2 | Example 3 | Example 4 | Example 5 | Example 6 | Example 7 | Example 8 | Example 9 |
|---|---|---|---|---|---|---|---|---|---|
| Conditional Expression (1) Fno | 2.20 | 2.24 | 1.89 | 2.06 | 2.08 | 2.09 | 2.09 | 2.09 | 2.09 |
| Conditional Expression (2) TTL/2 lb | 0.73 | 0.73 | 0.83 | 0.68 | 0.70 | 0.70 | 0.70 | 0.70 | 0.70 |
| Conditional Expression (3) f45 | −1.77 | −1.93 | −2.15 | −2.36 | −2.38 | −2.44 | −2.86 | −2.86 | −2.85 |

TABLE 10-continued

|  | Example 1 | Example 2 | Example 3 | Example 4 | Example 5 | Example 6 | Example 7 | Example 8 | Example 9 |
| --- | --- | --- | --- | --- | --- | --- | --- | --- | --- |
| Conditional Expression (4) r5/r6 | 0.47 | 0.29 | 0.43 | 0.10 | 1.31 | 1.79 | 2.24 | 2.56 | 1.59 |
| Conditional Expression (5) (r7 + r8)/(r7 − r8) | 1.34 | 1.42 | 1.27 | 0.89 | 0.72 | 0.82 | 0.94 | 0.93 | 0.91 |
| Conditional Expression (6) (r9 + r10)/(r9 − r10) | 0.61 | 0.59 | 0.58 | 0.88 | 1.30 | 1.38 | 1.49 | 1.50 | 1.47 |
| Conditional Expression (7) \|f3/f\| | 3.98 | 3.99 | 3.97 | 15.21 | 20.84 | 16.15 | 18.37 | 13.46 | 22.30 |
| Conditional Expression (8) f4/f | 0.63 | 0.70 | 0.65 | 0.80 | 0.81 | 0.84 | 0.99 | 1.01 | 0.99 |
| Conditional Expression (9) f5/f | −0.47 | −0.50 | −0.52 | −0.59 | −0.59 | −0.61 | −0.71 | −0.71 | −0.71 |
| Conditional Expression (10) T3/TTL | 0.11 | 0.12 | 0.10 | 0.12 | 0.13 | 0.13 | 0.12 | 0.13 | 0.12 |
| Conditional Expression (11) f1/f | 0.63 | 0.62 | 0.74 | 0.88 | 0.86 | 0.83 | 0.82 | 0.82 | 0.84 |
| Conditional Expression (12) r3/r4 | 35.56 | 19.01 | 5.63 | 2.88 | 3.78 | 3.51 | 3.48 | 3.62 | 2.79 |
| Conditional Expression (13) vd1~vd2 | 31.60 | 31.60 | 31.60 | 34.04 | 34.04 | 32.32 | 32.32 | 32.32 | 34.03 |
| Conditional Expression (14) vd3 | 55.57 | 55.57 | 56.16 | 55.66 | 55.66 | 55.66 | 55.66 | 55.66 | 55.66 |
| Conditional Expression (15) ih/f | 0.78 | 0.77 | 0.71 | 0.82 | 0.81 | 0.81 | 0.81 | 0.81 | 0.81 |

When the imaging lens composed of five constituent lenses according to the present invention is used in an image pickup device mounted in an increasingly compact and low-profile smartphone, mobile terminal, game console, information terminal such as a PC, or home appliance with a camera function, the camera can be low-profile and provide a low F-value, a wide field of view and high performance.

What is claimed is:

1. An imaging lens which forms an image of an object on a solid-state image sensor, comprising, in order from an object side to an image side of the imaging lens:
   a first lens with positive refractive power having a convex surface facing the object side;
   a second lens with negative refractive power having a convex surface facing the object side;
   a third lens with positive or negative refractive power;
   a fourth lens with positive refractive power; and
   a fifth lens with negative refractive power that is a double-sided aspheric lens having a concave surface facing the image side,
   wherein conditional expressions (1a), (2), (3), (4), (5a), and (6) below are satisfied:

$$Fno \leq 2.3 \quad (1a)$$

$$TTL/2ih < 0.9 \quad (2)$$

$$f45 < 0 \quad (3)$$

$$0 < r5/r6 < 4.0 \quad (4)$$

$$0.5 < (r7+r8)/(r7-r8) < 2.0 \quad (5a)$$

$$0.4 < (r9+r10)/(r9-r10) < 4.0 \quad (6)$$

where
   Fno: F-number
   ih: maximum image height
   TTL: total track length
   f45: composite focal length of the fourth lens and the fifth lens
   r5: curvature radius of an object-side surface of the third lens
   r6: curvature radius of an image-side surface of the third lens
   r7: curvature radius of an object-side surface of the fourth lens
   r8: curvature radius of an image-side surface of the fourth lens
   r9: curvature radius of an object-side surface of the fifth lens
   r10: curvature radius of an image-side surface of the fifth lens.

2. The imaging lens according to claim 1, wherein a conditional expression (7) below is satisfied:

$$3.0 < |f3/f1| \quad (7)$$

where
   f: overall focal length of the imaging lens
   f3: focal length of the third lens.

3. The imaging lens according to claim 1, wherein a conditional expression (8) below is satisfied:

$$0.4 < f4/f < 1.5 \quad (8)$$

where
   f: overall focal length of the imaging lens
   f4: focal length of the fourth lens.

4. The imaging lens according to claim 1, wherein a conditional expression (9) below is satisfied:

$$-1.2<f5/f<-0.2 \quad (9)$$

where
f: overall focal length of the imaging lens
f5: focal length of the fifth lens.

5. The imaging lens according to claim 1, wherein a conditional expression (10) below is satisfied:

$$0.08<T3/TTL<0.16 \quad (10)$$

where
T3: distance on an optical axis between the image-side surface of the third lens and the object-side surface of the fourth lens.

6. The imaging lens according to claim 1, wherein a conditional expression (11) below is satisfied:

$$0.5<f1/f<2.0 \quad (11)$$

where
f: overall focal length of the imaging lens
f1: focal length of the first lens.

7. The imaging lens according to claim 1, wherein a conditional expression (12) below is satisfied:

$$1.5<r3/r4<50 \quad (12)$$

where
r3: curvature radius of an object-side surface of the second lens
r4: curvature radius of an image-side surface of the second lens.

8. The imaging lens according to claim 1, wherein the fourth lens has a convex surface on facing the image side.

9. The imaging lens according to claim 1, wherein the fifth lens has a pole point separated from an optical axis on its image-side surface.

10. The imaging lens according to claim 1, wherein a conditional expression (13) below is satisfied:

$$20<vd1-vd2<40 \quad (13)$$

where
vd1: Abbe number of the first lens at d-ray
vd2: Abbe number of the second lens at d-ray.

11. The imaging lens according to claim 10, wherein a conditional expression (14) below is satisfied:

$$50<vd3<70 \quad (14)$$

where
vd3: Abbe number of the third lens at d-ray.

12. The imaging lens according to claim 1, wherein a conditional expression (15) below is satisfied:

$$0.70<ih/f<1.0 \quad (15)$$

where
f: overall focal length of the imaging lens
ih: maximum image height.

13. An imaging lens which forms an image of an object on a solid-state image sensor, comprising, in order from an object side to an image side of the imaging lens:
a first lens with positive refractive power having convex surfaces facing the object side and the image side;
a second lens with negative refractive power having a convex surface facing the object side;
a third lens with positive or negative refractive power having a meniscus shape, a convex object-side surface, and a concave image-side surface;
a fourth lens with positive refractive power; and
a fifth lens with negative refractive power that is a double-sided aspheric lens having a concave surface facing the image side,
wherein the imaging lens with a telephoto ratio (TTL/f) of less than 1.2, and
conditional expressions (1a), (2), (5a), (6), and (8') below are satisfied:

$$Fno \leq 2.3 \quad (1a)$$

$$TTL/2ih<0.85 \quad (2a)$$

$$0.5<(r7+r8)/(r7-r8)<2.0 \quad (5a)$$

$$0.4<(r9+r10)/(r9-r10)<3.0 \quad (6a)$$

$$0.4<f4/f<1.2 \quad (8a)$$

where
Fno: F-number
ih: maximum image height
TTL: total track length
r7: curvature radius of an object-side surface of the fourth lens
r8: curvature radius of an image-side surface of the fourth lens
r9: curvature radius of an object-side surface of the fifth lens
r10: curvature radius of an image-side surface of the fifth lens
f: overall focal length of the imaging lens
f4: focal length of the fourth lens.

14. The imaging lens according to claim 13, wherein a conditional expression (7) below is satisfied:

$$3.0<|f3|/f1 \quad (7)$$

where
f3: focal length of the third lens.

15. The imaging lens according to claim 13, wherein a conditional expression (10) below is satisfied:

$$0.08<T3/TTL<0.16 \quad (10)$$

where
T3: distance on an optical axis between the image-side surface of the third lens and the object-side surface of the fourth lens.

16. The imaging lens according to claim 13, wherein a conditional expression (15) below is satisfied:

$$0.70<ih/f<1.0 \quad (15).$$

17. An imaging lens which forms an image of an object on a solid-state image sensor, comprising, in order from an object side to an image side of the imaging lens:
a first lens with positive refractive power having a convex surface facing the object side;
a second lens with negative refractive power having a convex surface facing the object side;
a third lens with positive or negative refractive power having a meniscus shape, a concave object-side surface, and a convex image-side surface;
a fourth lens with positive refractive power having a biconvex shape; and
a fifth lens with negative refractive power that is a double-sided aspheric lens having a concave surface facing the image side,
wherein conditional expressions (1), (4), and (12b) below are satisfied:

$$Fno \leq 2.4 \quad (1)$$

$$0<r5/r6<4.0 \quad (4)$$

$$2.79<r3/r4<25 \quad (12b)$$

where
- Fno: F-number
- f45: composite focal length of the fourth lens and the fifth lens
- r3: curvature radius of an object-side surface of the second lens
- r4: curvature radius of an image-side surface of the second lens
- r5: curvature radius of the object-side surface of the third lens
- r6: curvature radius of the image-side surface of the third lens.

18. The imaging lens according to claim 17, wherein a conditional expression (10) below is satisfied:

$$0.08 < T3/TTL < 0.16 \qquad (10)$$

where
- T3: distance on an optical axis between the image-side surface of the third lens and an object-side surface of the fourth lens
- TTL: total track length.

19. The imaging lens according to claim 17, wherein a conditional expression (15) below is satisfied:

$$0.70 < ih/f < 1.0 \qquad (15)$$

where
- f: overall focal length of the imaging lens
- ih: maximum image height.

20. The imaging lens according to claim 17, wherein a conditional expression (2) below is satisfied:

$$TTL/2ih < 0.9 \qquad (2)$$

where
- ih: maximum image height
- TTL: total track length.

* * * * *